United States Patent

Namba et al.

[11] Patent Number: 5,966,448
[45] Date of Patent: Oct. 12, 1999

[54] CRYPTOGRAPHIC COMMUNICATION SYSTEM

[75] Inventors: Hikari Namba, Yokohama; Kazuo Takaragi, Ebina; Satoshi Miyazaki, Yamato, all of Japan

[73] Assignee: Hitachi, Ltd., Tokyo, Japan

[21] Appl. No.: 08/703,097

[22] Filed: Aug. 26, 1996

[30] Foreign Application Priority Data

Aug. 30, 1995 [JP] Japan ................................ 7-221928

[51] Int. Cl.$^6$ .............................. H04L 9/00; H04L 9/16
[52] U.S. Cl. ................................ 380/33; 380/37; 380/49
[58] Field of Search .................................. 380/49, 37, 33

[56] References Cited

U.S. PATENT DOCUMENTS

| | | | |
|---|---|---|---|
| 5,001,755 | 3/1991 | Skret | 380/46 |
| 5,381,480 | 1/1995 | Butter et al. | 380/37 |
| 5,475,757 | 12/1995 | Kelly | 380/24 |

OTHER PUBLICATIONS

"How to Realize an IC Card Cipher System Standardization", Research and Study Report on Desirable System Architecture and Standardization for Multipurpose IC Card Society in 1991, Mar. 1992, pp. 25–31.

"Modern Cryptographic Theory", Block Cipher and Stream Cipher, Institute of Electronics, Information and Communication Engineers of Japan, Ikeno, et al., Sep. 1, 1986, pp. 63–76.

"Modern Cryptographic Theory", Data Encryption Standard: DES, Institute of Electronics, Information and Communication Engineers of Japan, Ikeno, et al., Sep. 1, 1996, pp. 41–49.

"Modern Cryptographic Theory", RSA Public–Ley Crypto System, Institute of Electronics, Information and Communication Engineers of Japan, Ikeno, et al., Sep. 1, 1996, pp. 105–123.

"Development in Multimedia Encryption Algorithm Hisecurity–multi2 and Its Operation Mode", The Processing of The 1988 Joint Workshop on Information Theory and Its Applications, Cryptography and Information Security, Takaragi, et al., pp. 167–173.

*Primary Examiner*—Gail O. Hayes
*Assistant Examiner*—Carmen D. White
*Attorney, Agent, or Firm*—Fay Sharpe Beall Fagan Minnich McKee

[57] ABSTRACT

According to a cryptographic communication system which can safely perform cipher conversion processing when cryptographic communication is performed between terminals using different cipher types, when a terminal 10A-1 connected to a LAN-A using a cryptographic algorithm C1 transmits data to a terminal 10B-1 connected to a LAN-B using a cryptographic algorithm C2, the terminal 10A-1 generates two meaningless data items from the data to be transmitted, decrypts the two generated data items according to the cryptographic algorithm C1, and then transmits the decrypted data to two cryptographic protocol conversion servers and for dividing the data into two data items. Each of the cryptographic protocol conversion servers decrypts each transmitted data item, the re-encrypts the decrypted data according to the cryptographic algorithm C2, and then transmits the data to the terminal 10B-1. The terminal 10B-1 restores original transmission data on the basis of the two data items transmitted from the respective cryptographic protocol conversion servers.

52 Claims, 17 Drawing Sheets

TRANSMISSION DATAd

| d1 | d2 | d3 | d4 | d5 | d6 | d7 | d8 | d9 | d10 |

=

DATAa TO BE TRANSMITTED TO CRYPTOGRAPHIC PROTOCOL CONVERSION SERVER1 (30A)

| a1 | a2 | a3 | a4 | a5 | a6 | a7 | a8 | a9 | a10 |

DATAb TO BE TRANSMITTED TO CRYPTOGRAPHIC PROTOCOL CONVERSION SERVER2 (30B)

| b1 | b2 | b3 | b4 | b5 | b6 | b7 | b8 | b9 | b10 |

EXAMPLE OF METHOD OF GENERATING DATAa, b
( 1 ) ANY RANDOM NUMBER IS SET TO a1
( 2 ) $b1 = d1 \oplus a1$
( 3 ) $a2 = b1, b2 = d2 \oplus a2$
( 4 ) $a(i) = b(i-1), b(i) = d(i) \oplus a(i)$  $(3 =< i < = 10)$ $M(i) (1 =< i =< n)$ : PLAINTEXT SERIES $C(i) (1 =< i =< n)$ : CIPHERTEXT SERIES TO PLAINTEXT SERIES $M(i)$

IV : INITIAL CONSTANT

Ek : ENCRYPTION FUNCTION USING CIPHER KEY k

Dk : DECRYPTION FUNCTION USING CIPHER KEY k $C(1) = Ek(M(1) \oplus IV)$ $C(i) = Ek(M(i) \oplus C(i-1)), (2 =< i =< n)$ $M(1) = Dk(C(1)) \oplus IV$ $M(i) = Dk(C(i)) \oplus C(i-1), (2 =< i =< n)$

FIG.12

MAIN STORAGE DEVICE — 1102

| |  |
|---|---|
| C2 ENCRYPTION PROGRAM | — 1201 |
| C2 DECRYPTION PROGRAM | — 1202 |
| SHARING PROGRAM | — 1203 |
| RESTORING PROGRAM | — 1204 |
| WORK AREA | — 1205 |
| KEY KAB1 | — 1206 |
| CIPHER INITIAL VALUE B1 | — 1207 |
| KEY KBB1 | — 1208 |
| CIPHER INITIAL VALUE B2 | — 1209 |
| IDENTIFIER OF TERMINAL 10B-1 | — 1210 |
| SERVER1 IDENTIFIER | — 1211 |
| SERVER2 IDENTIFIER | — 1212 |

FIG.14

DATAa RECEIVED VIA CRYPTOGRAPHIC PROTOCOL
CONVERSION SERVER1 (30A)

| a1 | a2 | a3 | a4 | a5 | a6 | a7 | a8 | a9 | a10 |

$\oplus$

DATAb RECEIVED VIA CRYPTOGRAPHIC PROTOCOL
CONVERSION SERVER2 (30B)

| b1 | b2 | b3 | b4 | b5 | b6 | b7 | b8 | b9 | b10 |

$=$

ORIGINAL TRANSMISSION DATAd

| d1 | d2 | d3 | d4 | d5 | d6 | d7 | d8 | d9 | d10 |

⟨RESTORING METHOD OF ORIGINAL TRANSMISSION DATAd⟩
$d(i) = a(i) \oplus b(i) \quad (1 =< i < = 10)$

CRYPTOGRAPHIC COMMUNICATION SYSTEM

BACKGROUND OF THE INVENTION

1. Field of the Invention

The present invention relates to a cryptographic communication system which enables cryptographic communication between terminals using different cipher types.

2. Description of Related Art

An algorithm confidential type and an algorithm public type have been used for cipher. The former type has been used in a concealed manner in the military, etc. while the latter type has been made public and used in banks, etc. In both types, one kind of cipher is used to perform cryptographic communication in a closed network.

Following recently computers which are used to open to external, as means of multi-vendor, or to connect to the internet, it is expected that users will have a requirement for networks to which terminals using different algorithm public types are connected to be mutually connected to one another, and for cryptographic communication to be performed between these terminals connected to the networks.

In 1991, the International Organization for Standardization (ISO) established a registration system of cryptographic algorithm, and it has been determined that cryptographic algorithms are not standardized to one kind and plural kinds of cipher which are permitted and registered are publicly known. Consequently, a possibility occurs for plural kinds of cipher to be separately and individually used in different areas even in the future. In Japan, JIS (Japanese Industrial Standards) of the registration system for cryptographic algorithm of ISO in 1994 is being established.

In the case where networks to which terminals using different cipher types are connected are mutually connected to one another, in order to perform cryptographic communication between the terminals connected to these networks, it is required that transmission data encrypted by a terminal at a transmission side (hereinafter referred to as "transmission terminal") are temporarily converted to data which are encrypted according to a cipher type used by a terminal at a reception side (hereinafter referred to as "reception terminal" because the transmission terminal can only encrypt the transmission data according to a cipher type used by itself, while the reception terminal can only decrypt those data which are encrypted according to a cipher type used by itself.

As a publicly know technique on such a cipher conversion processing, a cryptographic protocol conversion device is disclosed in a research and study report "RESEARCH AND STUDY REPORT ON DESIRABLE SYSTEM ARCHITECTURE AND STANDARDIZATION FOR MULTI-PURPOSE IC CARD SOCIETY IN 1991" of Japanese Standardization Association Foundation (pp. 25–31, March 1992, Japan Society of Mechanical Engineers 3 Standardization-20).

The cryptographic protocol conversion device is disposed on a communication line connecting two networks to which terminals using different cipher types are connected, and two kinds of cryptographic algorithms (encryption algorithm and decryption algorithm) which are respectively used in the two networks are provided.

The cryptographic protocol conversion device performs the following cipher conversion processing. That is, transmission data which are encrypted according to a cipher used by a transmission terminal are temporarily decrypted according to a decryption algorithm of the cipher used by the terminal of the transmission side, and then the decrypted data are encrypted according to an encryption algorithm of a cipher used by a reception terminal, the decryption algorithm and the encryption algorithm being provided in the cryptographic protocol conversion device.

In the above-described cryptographic protocol conversion device, however, since the data encrypted by the transmission terminal are temporarily decrypted, that is, the encrypted data are temporarily returned to plain data before the cipher processing (i.e. plaintext), a third party has a chance of robbing the plaintext and thus there is a risk that confidentiality of the data compromised.

SUMMARY OF THE INVENTION

Therefore, a first object of the present invention is to provide a cryptographic communication system which can safely perform cipher conversion processing when cryptographic communication is performed between terminals using different cipher types.

In the above-described research and study report on the publicly known technique, only one cryptographic protocol conversion device is disposed. When the amount of data to be transmitted is large, it is estimated that the cipher conversion processing cannot be performed at high speed by only one cryptographic protocol conversion device, and overheads for the cipher conversion processing become large. It is now expected large-capacity communication extending to tera (1 tera=1 giga×1000) bps will come in the future, and in the event of such large-capacity communication, increase of the communication speed in a communication passage will become an important factor.

Therefore, a second object of the invention is to provide a cryptographic communication system which can perform cipher conversion processing at high speed when cryptographic communication is performed between terminals using different cipher types.

Further, the above-described cryptographic protocol conversion device is designed to have two kinds of cryptographic algorithms (encryption algorithm and decryption algorithm) which are used by the respective terminals. When networks to which these terminals are connected belong to different countries respectively, the cryptographic communication cannot necessarily be realized. Actually, for example, the USA legally regulates the import and export of cryptographic devices and software (encoding and decoding) (U.S.-govermental standard encryption algorithm, Data Encryption Standards DES, etc.). When such regulations are applied, an encryption algorithm used by a terminal which is connected to a network belonging to a country is prohibited from being installed into a cryptographic protocol conversion device which is disposed in another country, so that the cryptographic communication cannot be performed.

Therefore, a third object of the present invention is to provide a cryptographic communication system which can achieve the first object even when terminals using different cipher types belong to different countries.

In order to attain the first object, data which are communicated (transmitted and received) between terminals using different cipher types are allowed to pass through plural cryptographic protocol conversion servers so that the above-described cipher conversion processing is performed while being shared among the plural cryptographic protocol conversion servers. In order to share the cipher conversion processing among the plural cryptographic protocol conversion servers, a transmission terminal generates plural data to be shared among the plural cryptographic protocol conversion servers from the data to be transmitted.

Therefore, according to a first aspect of the present invention, a cryptographic communication system includes at least one of first type terminals using a first cipher type, at least one of second type terminals using a second cipher type different from the first cipher type, and n cryptographic protocol conversion servers ($n \geq 2$) using the first and second cipher types, the first type terminals, the second type terminals and the cryptographic protocol conversion servers being connected to one another through at least one of networks, wherein each of the first type terminals includes:

(1) sharing means for generating k items of data to be shared among k cryptographic protocol conversion servers ($n \geq k \geq 2$) of the n cryptographic protocol conversion servers on the basis of the data to be transmitted to a terminal of the second type terminals, (2) encryption means for encrypting the k items of data generated by the sharing means according to the first cipher type;

(3) transmitting means for adding terminal information representing a transmission terminal and a reception terminal to the k items of data encrypted by the encryption means, and then transmitting these data to the k cryptographic protocol conversion servers;

(4) decryption means for decrypting the k items of data transmitted from each of the k cryptographic protocol conversion servers according to the first cipher type; and (5) restoring means for restoring original data from the k items of data decrypted by the decryption means; wherein each of the second type terminals includes:

(1) sharing means for generating k items of data to be shared among k cryptographic protocol conversion servers ($n \geq k \geq 2$) of the n cryptographic protocol conversion servers on the basis of the data to be transmitted to a terminal of the first type terminals;

(2) encryption means for encrypting the k items of data generated by the sharing means according to the second cipher type;

(3) transmitting means for adding terminal information representing a transmission terminal and a reception terminal to the k items of data encrypted by the encryption means, and then transmitting these data to the k cryptographic protocol conversion servers;

(4) decryption means for decrypting the k items of data transmitted from each of the k cryptographic protocol conversion servers according to the second cipher type; and (5) restoring means for restoring original data from the k items of data decrypted by the decryption means;

each of the n cryptographic protocol conversion servers includes:

(1) cipher conversion means for decrypting one item of data transmitted from any one of the first type terminals and the second type terminals according to the cipher type which is used by a transmission terminal indicated by the terminal information added to the data, and then re-encrypting the data according to the cipher type which is used by a reception terminal indicated by the terminal information added to the data; and (2) transmitting means for transmitting one item of data re-encrypted by the cipher conversion means to the reception terminal indicated by the terminal information added to the data.

For example, the sharing means may generate k items of data which becomes equal to the original data when an exclusive OR operation performed on the k items of data. In this case, the sharing means may scramble the data before generating k items of data from data , for every fixed data amount, and then generating the k items of data from the scrambled data. The fixed amount of data is preferably smaller than an amount of data for one character.

For example, the cipher conversion means may perform the decrypting and re-encrypting every fixed data amount.

Further, in order to attain the second object, data which are separately subjected to the cipher conversion processing by the plural cryptographic protocol conversion servers, that is, each of plural items of data which are generated by a transmission terminal is set to have a data amount which is smaller than the data amount of original data.

That is, the sharing means generates k items of data each having the same data amount, and a smaller data amount than that of the data before the k items of data are generated.

For example, the sharing means may generate the k items of data by successively sharing the data before the generation every fixed data amount. In this case, the sharing means may scramble the data every fixed data amount before the generation, and then generate the k items of data from the scrambled data.

In order to attain the third object, when terminals using different cipher types belong to different countries respectively, one cipher type which is arranged to be commonly used by these countries is used to encrypt data to be transmitted according to this arranged cipher type when the data are communicated between these terminals beyond the boundaries of these countries.

As described above, if the arranged cipher is used, it would be unnecessary for each cryptographic protocol conversion server belonging to a country to use a cipher type used by a terminal belonging another different country, and a cryptographic communication system to achieve the first object can be constructed.

Therefore, according to a second aspect of the present invention, a cryptographic communication system includes at least one of first type terminals using a first cipher type, at least one of second type terminals using a second cipher type different from the first cipher type, n first type cryptographic protocol conversion servers ($n \geq 2$) using a third cipher type which is different from the first and n second cipher types, and second type cryptographic protocol conversion servers ($n \geq 2$) which use the second and third cipher types and each of which beforehand corresponds to each of the n first type cryptographic protocol servers, the first and second type terminals and the first and second type cryptographic protocol conversion servers being connected to one another through at least one of networks, wherein each of the first type terminals includes:

(1) sharing means for generating k items of data to be shared among k cryptographic protocol conversion servers ($n \geq k \geq 2$) of the n first type cryptographic protocol conversion servers on the basis of the data to be transmitted to a terminal of the second type terminals;

(2) encryption means for encrypting the k items of data generated by the sharing means according to the first cipher type;

(3) transmitting means for adding terminal information representing a transmission terminal and a reception terminal to the k items of data encrypted by the encryption means, and then transmitting these data to the k first type cryptographic protocol conversion servers;

(4) decryption means for decrypting the k items of data transmitted from each of the k first type cryptographic protocol conversion servers according to the first cipher type; and (5) restoring means for restoring original data from the k items of data decrypted by the decryption means;

wherein each of the second type terminals includes:

(1) sharing means for generating k items of data to be shared among k cryptographic protocol conversion servers ($n \geq k \geq 2$) of the n second type cryptographic protocol conversion servers on the basis of the data to be transmitted to a terminal of the first type terminals;

(2) encryption means for encrypting the k items of data generated by the sharing means according to the second cipher type;

(3) transmitting means for adding terminal information representing a transmission terminal and a reception terminal to the k items of data encrypted by the encryption means, and then transmitting these data to the k second type cryptographic protocol conversion servers;

(4) decryption means for decrypting the k items of data transmitted from each of the k second type cryptographic protocol conversion servers according to the second cipher type; and (5) restoring means for restoring original data from the k items of data decrypted by the decryption means;

each of the n first type cryptographic protocol conversion servers includes:

(1) cipher conversion means for decrypting one item of data transmitted from any one of the first type terminals according to the first cipher type and then re-encrypting the data according to the third cipher type and for decrypting one item of data transmitted from a corresponding one cryptographic protocol conversion server of the n second type cryptographic protocol conversion servers according to the third cipher type and then re-encrypting the data according to the first cipher type; and (2) transmitting means for transmitting one item of data re-encrypted according to the third cipher type by the cipher conversion means to a corresponding one cryptographic protocol conversion server of the n second type cryptographic protocol conversion servers and for transmitting one item of data re-encrypted according to the first cipher type by the cipher conversion means to a reception terminal indicated by the terminal information added to the data; and each of the n second type cryptographic protocol conversion servers includes:

(1) cipher conversion means for decrypting one item of data transmitted from any one of the second type terminals according to the second cipher type and then re-encrypting the data according to the third cipher type and for decrypting one item of data transmitted from a corresponding one cryptographic protocol conversion server of the n first type cryptographic protocol conversion servers according to the third cipher type and then re-encrypting the data according to the second cipher type; and (2) transmitting means for transmitting one item of data re-encrypted according to the third cipher type by the cipher conversion means to a corresponding one cryptographic protocol conversion server of the n first type cryptographic protocol conversion servers and for transmitting one item of data re-encrypted according to the second cipher type by the cipher conversion means to a reception terminal indicated by the terminal information added to the data.

According to the cryptographic communication system of the present invention, in the transmission terminal, plural items of data which are difficult to be recognized in a plaintext style are generated from the data to be transmitted by the sharing means, and the cipher conversion processing is performed and for being divided among the plural cryptographic protocol conversion servers. Therefore, even when data in the plaintext style are stolen from all the cryptographic protocol conversion servers, the confidentiality of the data is maintained insofar as a method of generating on original data from the plural data is unknown. Conversely, even if the method of generating the plural data is known, the confidentiality of the data is maintained insofar as not all the data in the plaintext style are stolen from all the cryptographic protocol conversion servers.

Further, if the cipher conversion means performs the cipher conversion processing every fixed data amount in the cryptographic protocol conversion server, the amount of data simultaneously set in the plaintext style is only the fixed data amount. Therefore, the time required to set the data in the plaintext style can be shortened. In addition, even when the data in the plaintext style are stolen during this time, only the data having the fixed data amount are stolen and identified.

Still further, if the sharing means generates, from the data to be transmitted, plural items of data each having a data amount smaller than the data amount of the data, the load for the cipher conversion processing is shared among the plural cryptographic protocol conversion servers, so that the load of the cipher conversion processing which is imposed on each cryptographic protocol conversion server can be reduced.

BRIEF DESCRIPTION OF THE INVENTION

FIG. 12 is a diagram showing a format being used for a main storage device of the reception terminal;

FIG. 14 is a diagram showing a restoring method based on a restoring program;

DETAILED DESCRIPTION OF THE PREFERRED EMBODIMENTS

Preferred embodiments of the present invention will be described with reference to the accompanying drawings.

Figure 1:
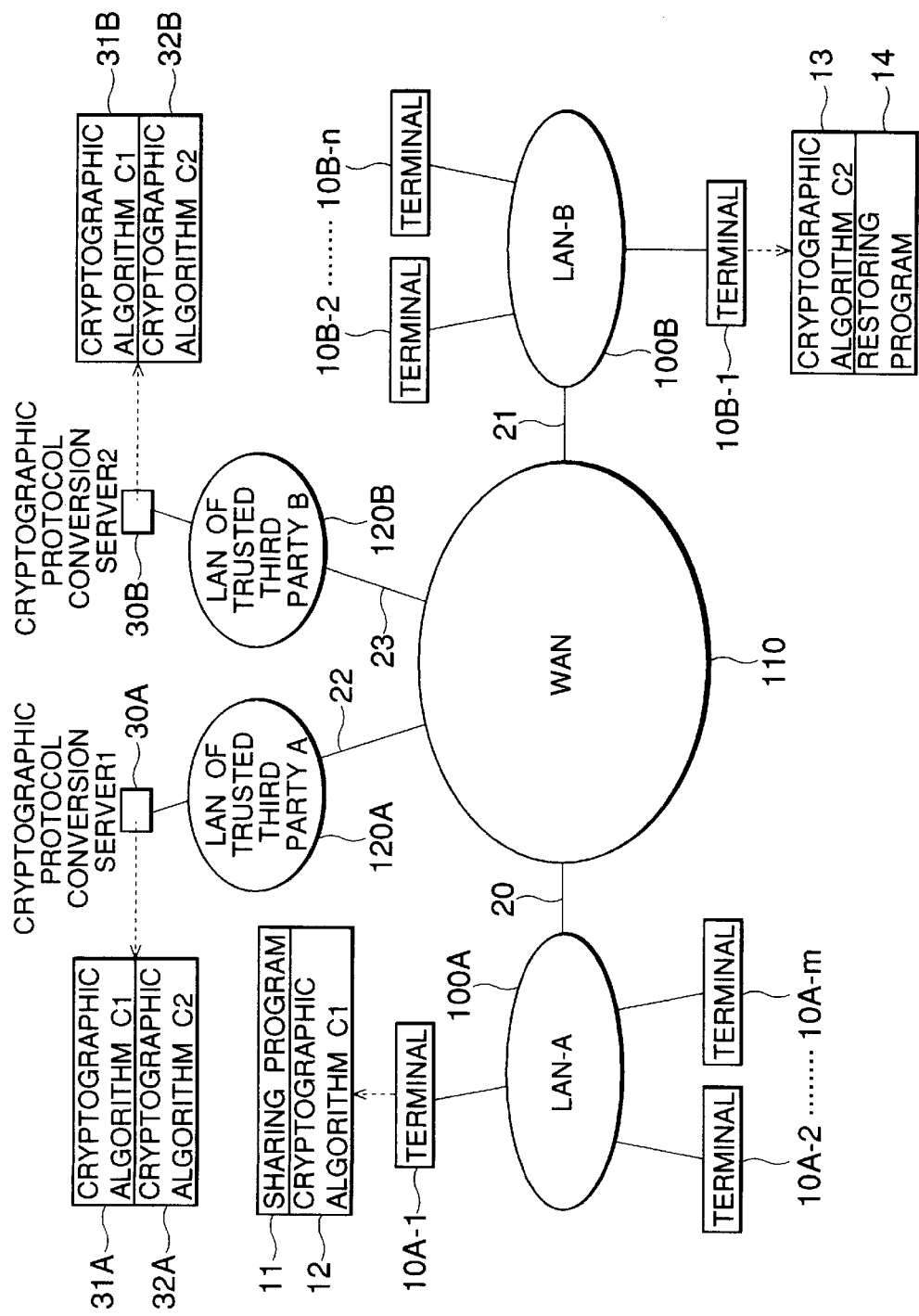
FIG. 1 is a diagram showing a cryptographic communication system according to a first embodiment of the present invention.

FIG. 1 is a diagram showing a cryptographic communication system according to a first embodiment of the present invention.

The cryptographic communication system shown in FIG. 1 is constructed to perform cryptographic communication between any terminals which are connected to two LANs (Local Area Network), LAN-A (110A) and LAN-B (100B) using different cipher types.

The cryptographic communication is performed via WAN (Wide Area Network) 110, a cryptographic protocol conversion server 1 (30A) and a cryptographic protocol conversion server 2 (30B).

As shown in FIG. 1, the LAN-A (100A) is provided with a cryptographic algorithm C1 (12), and is a local area network to which plural terminals 10A-1 to 10A-m using the cryptographic algorithm C1 (12) are connected. The LAN-B (100B) is provided with a cryptographic algorithm C2 (13), and is a local area network to which plural terminals 10B-1 to 10B-n using the cryptographic algorithm C2 (13) are connected. The respective local area networks are connected to the WAN 110 through communication lines 20 and 21.

Further, a LAN (120A) of a trusted third party A to which the cryptographic protocol conversion server 1 (30A) belongs, and a LAN (120B) of a trusted third party B to which the cryptographic protocol conversion server 2 (30B) belongs, are respectively connected to the WAN 110 through communication lines 22 and 23.

The operation of the cryptographic communication system will be briefly described by representatively citing a case where cryptographic communication is performed from the terminal 10A-1 connected to the LAN-A (100A) to the terminal 10B-1 connected to the LAN-B (100B).

The terminal 10A-1 at a transmission side (i.e., transmission terminal 10A-1) performs share processing of sharing data to be transmitted to the terminal 10B-1 at a reception side (i.e., reception terminal 10B-1) into two data items according to its own sharing program. After the share processing, the terminal 10A-1 encrypts one of the data items according to its own algorithm C1 (12), and transmits the encrypted data through the WAN 110 to the cryptographic protocol conversion server 1 (30A). Further, the terminal 10A-1 encrypts the other data item according to its own algorithm C1 (12), and transmits the ciphered data through the WAN 110 to the cryptographic protocol conversion server 2 (30B).

Each of the cryptographic protocol conversion server 1 (30A) and the cryptographic protocol conversion server 2 (30B) performs cipher conversion processing of decryption the data transmitted from the terminal 10A-1 according to its own algorithm C1 (31A, 31B) and then re-encrypting the decrypted data according to the algorithm C2 (32A, 32B) which is identical to the algorithm C2 (13) provided in the reception terminal 10B-1. Thereafter, each of the cryptographic protocol conversion server 1 (30A) and the cryptographic protocol conversion server 2 (30B) transmits the data after the cipher conversion processing to the reception terminal 10B-1 through the WAN 110.

The reception terminal 10B-1 decrypts the data transmitted from the cryptographic protocol conversion server 1 (30A) and the data transmitted from the cryptographic protocol conversion server 2 (30B) by using its own algorithm C2 (13), and further restores the two decrypted data into original data by using its own restoring program 14.

This embodiment is characterized in that confidentiality of data which are kept in a plaintext style during the cipher conversion processing in the prior art can be enhanced by improving the sharing method based on the sharing program 11. The further details of the cryptographic communication system, containing an improvement to the sharing method, will be described hereunder.

In the following description, the detailed operation of the cryptographic communication system will be described by representatively using a case of cryptographic communication from the terminal 10A-1 connected to the LAN-A (10A) to the terminal 10B-1 connected to the LAN-B (100B) when the LAN-A (100A) and the LAN-B (100B) use different symmetric block ciphers having the same block length.

First, the operation of the transmission terminal 10A-1 will be described.

Figure 2:
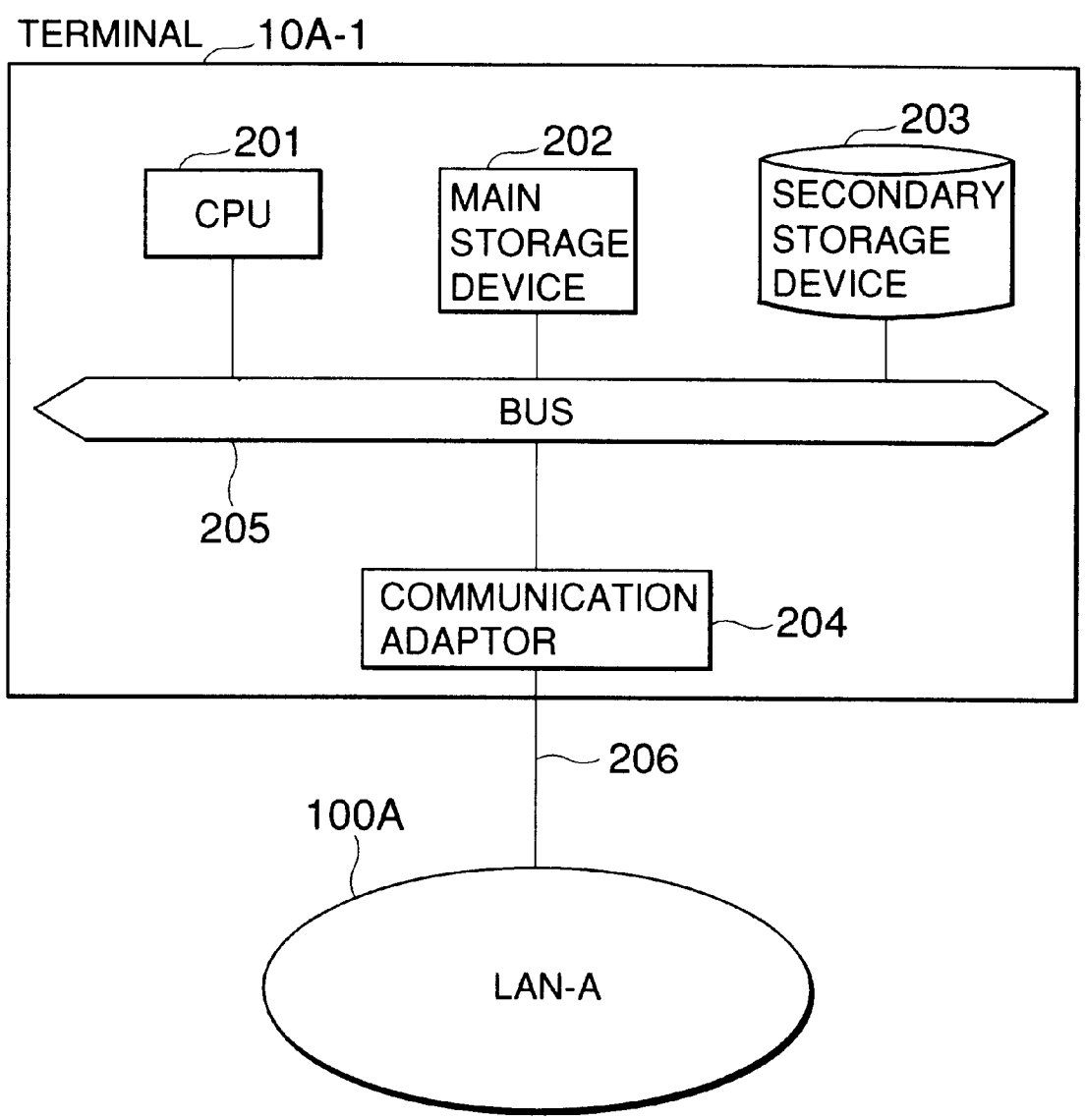
FIG. 2 is a diagram showing a main part of the hardware of a transmission terminal.

FIG. 2 is a diagram showing the main part of the hardware of the terminal 10A-1.

As shown in FIG. 2, the terminal 10A-1 includes a CPU (Central Processing Unit) 201 for performing arithmetic and logical operation, a main storage device 202 and a secondary storage device 203 for storing data, a communication adaptor 204 for controlling communication between the terminal and the outside of the terminal, and a bus 205 for connecting the above elements therethrough, and the terminal 10A-1 is connected to the LAN-A (100A) by a communication line 206 and through the communication adaptor 204.

Figure 3:
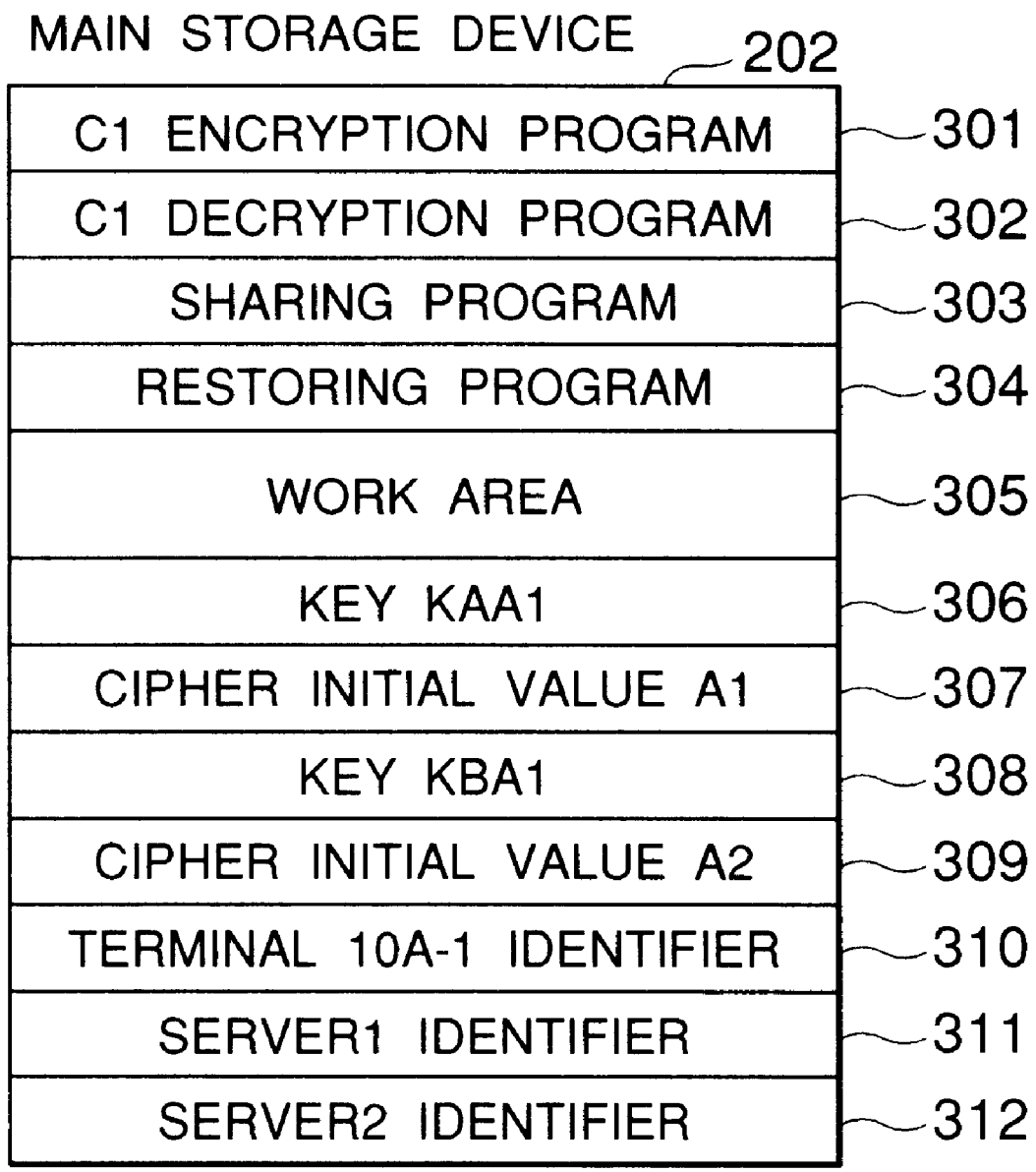
FIG. 3 is a diagram showing a format being used for a main storage device of the transmission terminal.

FIG. 3 is a diagram showing the format being used of the main storage device 202 of the terminal 10A-1.

As shown in FIG. 3, in the main storage device 202 are stored a C1 encryption program 301 and a C1 decryption program 302 which use the cryptographic algorithm C1 used by the LAN-A (100A), a sharing program 303 for sharing data to be transmitted, and a restoring program 304 for restoring data transmitted from the cryptographic protocol conversion server 1 (30A) and the cryptographic protocol conversion server 2 (30B) into original data. In addition, a work area 305 is also secured in the main storage device.

Further, as information used for transmission and reception in the cryptographic communication there are also stored a key KAA1 (306) and a cipher initial value (random number) A1 (307) for the cryptographic communication with the cryptographic protocol conversion server 1 (30A), a key KBA1 (308) and a cipher initial value (random number) A2 (309) for the cryptographic communication with the cryptographic protocol conversion server 2 (30B), a terminal identifier (310) of the terminal 10A-1, a server identifier (311) of the cryptographic protocol conversion server 1 (30A) and a server identifier (312) of the cryptographic protocol conversion server 2 (30B).

Figure 4:
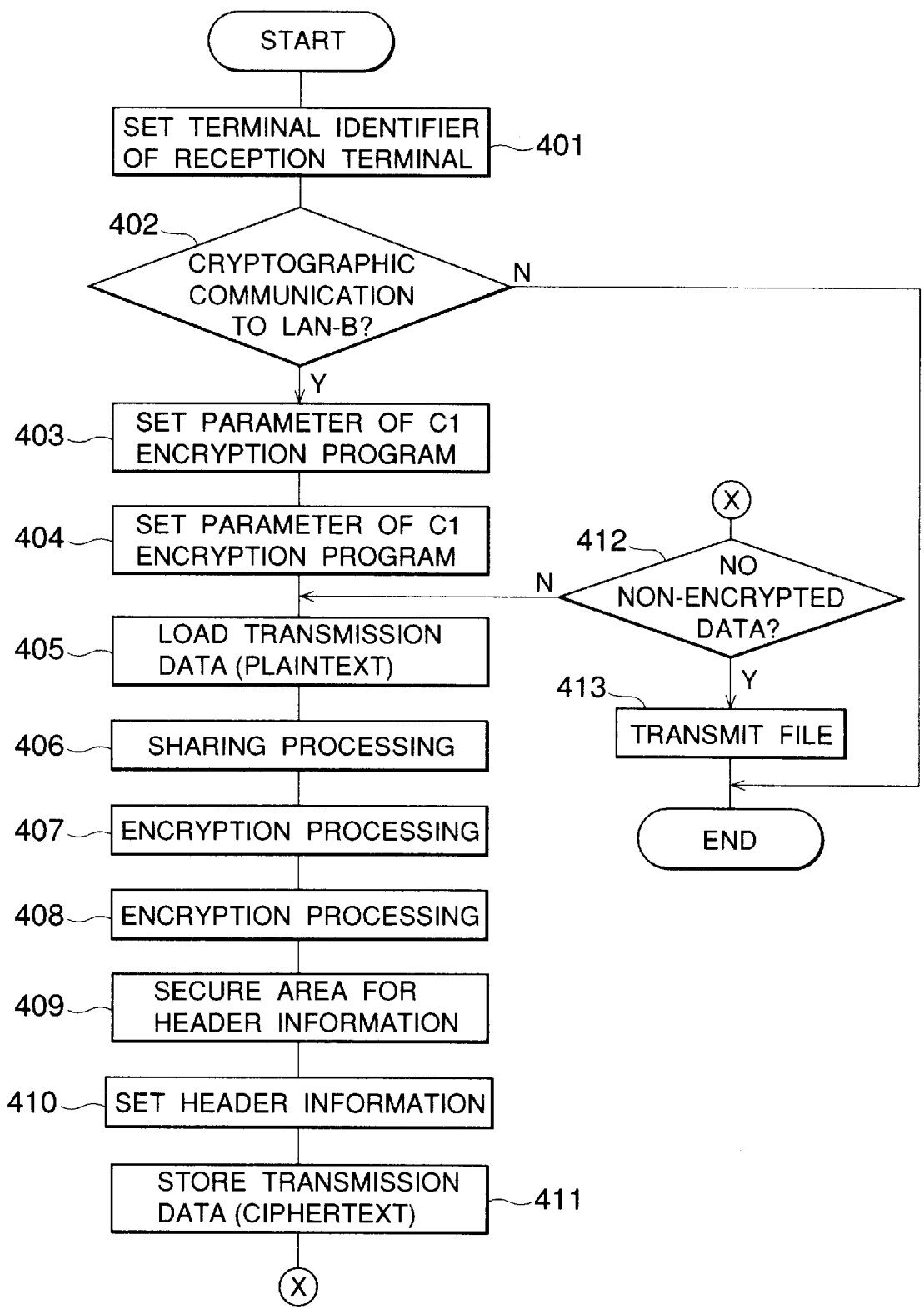
FIG. 4 is a flowchart showing a transmission processing procedure of the transmission terminal.

FIG. 4 is a flowchart showing a transmission processing procedure of the terminal 10A-1.

As shown in FIG. 4, upon input of a transmission request for the cryptographic communication, the terminal 10A-1, sets in the work area 305 a terminal identifier of a reception terminal which is input by a transmitter together with the transmission request (here, the terminal identifier of the terminal 10B-1) (step 401).

Subsequently, the LAN to which the reception terminal is connected (here, LAN-B (100B)) is identified on the basis of the terminal identifier of the terminal which is set in the work area 305 in step 401 (here, the terminal identifier of the terminal 10B-1) (step 402).

Subsequently, the key KAA1 (306) and the cipher initial value A1 (307) for the cryptographic communication with the cryptographic protocol conversion server 1 (30A), which serve as parameters of the C1 encryption program 301, are set in the work area 305 Instep 403). Here, the cipher initial value A1 (307) is a constant (random number) which is used for encryption/decryption in a CBC (Cipher Block Chaining) mode. The CBC mode will be described later.

Subsequently, the key KBA1 (308) and the cipher initial value A2 (309) for the cryptographic communication with the cryptographic protocol conversion server 2 (30B), which serve as parameters of the C1 encryption program 301, are set in the work area 305 (step 404). The cipher initial value A2 (309) has the same function as the cipher initial value A1 (307).

Subsequently, those data which are prepared beforehand and stored in the plaintext style in a file A in the secondary storage device 203 and are to be transmitted to the terminal 10B-1 are loaded into the work area 305 (step 405).

Subsequently, the share processing for sharing the data loaded into the work area 305 in step 405 among the two cryptographic protocol conversion servers 1 (30A) and 2 (30B) (step 406) is performed by using the sharing program 303 (step 406).

Here, the sharing method based on the sharing program 11 will be described with reference to FIG. 5.

Figure 5:
FIG. 5 is a diagram showing a sharing method based on a sharing program.

In the case shown in FIG. 5, data items a and b to be shared to the cryptographic protocol conversion server 1 (30A) and the cryptographic protocol conversion server 2 (30B) respectively are generated on the basis of the original data d and any random number a1 by using an exclusive OR operation.

In detail, any random number is first given to a1, and the result of the exclusive OR operation between d1 and a1 is set as b1. Subsequently, b1 is set as a2, and the result of the exclusive OR operation between d2 and a2 is set as b2. By repeating the same operation, the data a comprising a1 to a10 and the data b comprising b1 to b10 are generated from the original data d comprising d1 to d10.

The content of each of the data items a and b thus generated is disturbed, and thus it becomes incomprehensible (or meaningless).

The sharing method is not limited to the above method. For example, there may be used any sharing method in which even when a data item of the plaintext style in any one of the two cryptographic protocol conversion servers 1(30A) and 2(30B) is stolen, the content of the original data is incomprehensible (meaningless) when using only the one data item of the original data.

Returning to FIG. 4, the terminal 10A-1 supplies the parameters set in the step 403 to the C1 encryption program 301 to execute the C1 encryption program 301, whereby the data to be given to the cryptographic protocol conversion server 1 (30A) (here, data a) are encrypted in the CBC mode (step 407).

The encryption in the CBC mode will be hereunder described with reference to FIG. 6.

Figure 6:
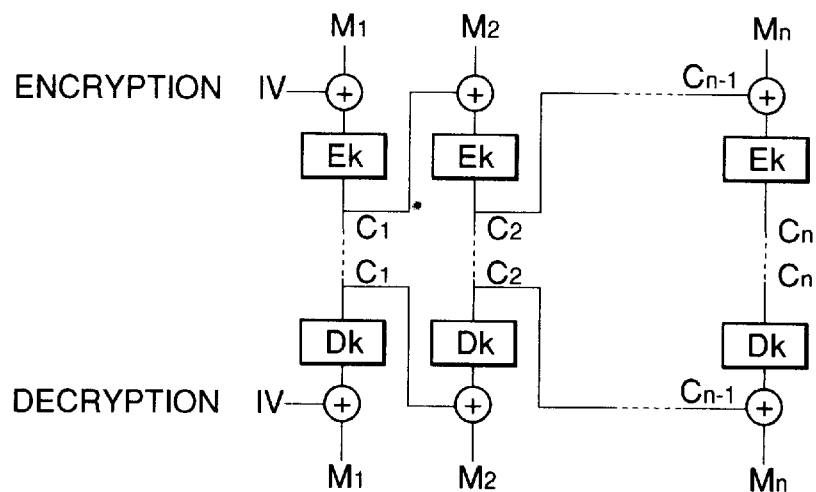
FIG. 6 is a diagram showing an encryption in a CBC mode.

As shown in FIG. 6, the CBC mode is a block cipher mode which is normally used at present (has been standardized by ISO) to enhance the cryptographic strength. In this mode, one encrypted data block is entangled with one data block to be next encrypted by performing an exclusive OR operation between these data blocks, and this operation is successively repeated to link the respective data blocks to one another, thereby performing the encryption operation. The method of using the symmetric block cipher is disclosed in "Modern Cryptographic Theory" (Institute of Electronics, Information and Communication Engineers of Japan), pp 64–76.

Returning to FIG. 4 again, the terminal 10A-1 supplies the parameters set in the step 404 to the C1 encryption program 301 to execute the C1 encryption program 301, and the data to be given to the cryptographic protocol conversion server 2 (30B) (here, data b) are encrypted in the CBC mode (step 408).

Subsequently, in the work area 305 there are secured an area for creating header information which is used in the cryptographic communication via the cryptographic protocol conversion server 1 (30A), and an area for creating header information which is used in the cryptographic communication via the cryptographic protocol conversion server 2 (30B) (step 409).

Figure 7:
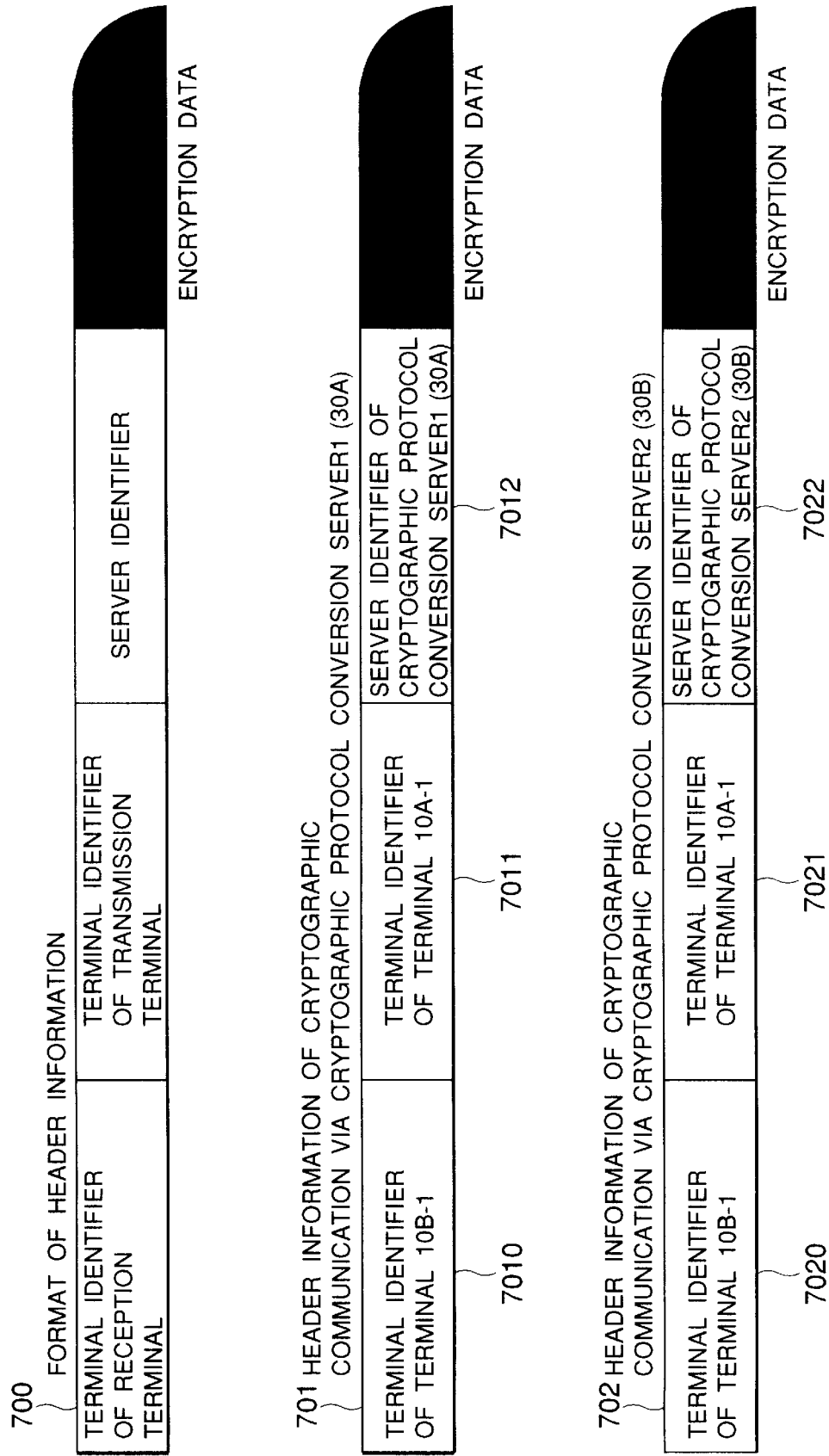
FIG. 7 is a diagram showing a format of header information.

Subsequently, the header information is set in the areas secured in the step 409 (step 410) on the basis of the format 700 shown in FIG. 7. Specifically, the terminal identifier of the terminal 10B-1 which is set in the work area 305 in step 401, the terminal identifier 310 of the terminal 10A-1 which is a transmission terminal, and header information 701 comprising the server identifier 311 of the cryptographic protocol conversion server 1 (30A) (in FIG. 7, 7010, 7011, 7012 respectively) are set in one area, and the terminal identifier of the terminal 10B-1 which is set in the work area 305 in step 401, the terminal identifier 310 of the terminal 10A-1 which is the transmission terminal, and header information 702 comprising the server identifier 312 of the cryptographic protocol conversion server 2 (30B) (in FIG. 7, 7020, 7021, 7022, respectively) are set in the other area.

Subsequently, the data encrypted in step 407 are stored in a file A while the header information 701 set in step 410 is attached to the top of the file A, and the data encrypted in step 408 are stored in a file A2 while the header information 702 set in step 410 is attached to the top of the file A2 (step 411).

Subsequently, it is judged whether non-encrypted data are stored in the file A (step 412). If some data have been stored in the file A, the steps 405 to 411 are repeated. In this case, the header information 701, 702 is only attached to the tops of the files A1, A2. Actually, the header information is required for every packet serving as a transmission unit. However, in this case, the transmission unit is assumed to be a file unit in order to make the description simple.

On the other hand, if non-encrypted data are not stored in the file A, the files A1, A2 are transmitted through the WAN 110 to the cryptographic protocol conversion server 1 (30A) and the cryptographic protocol conversion server 2 (30B) respectively (step 413).

Next, the operation of the cryptographic protocol conversion server 1 (30A), and the cryptographic protocol conversion server 2 (30B) will be described.

Figure 8:
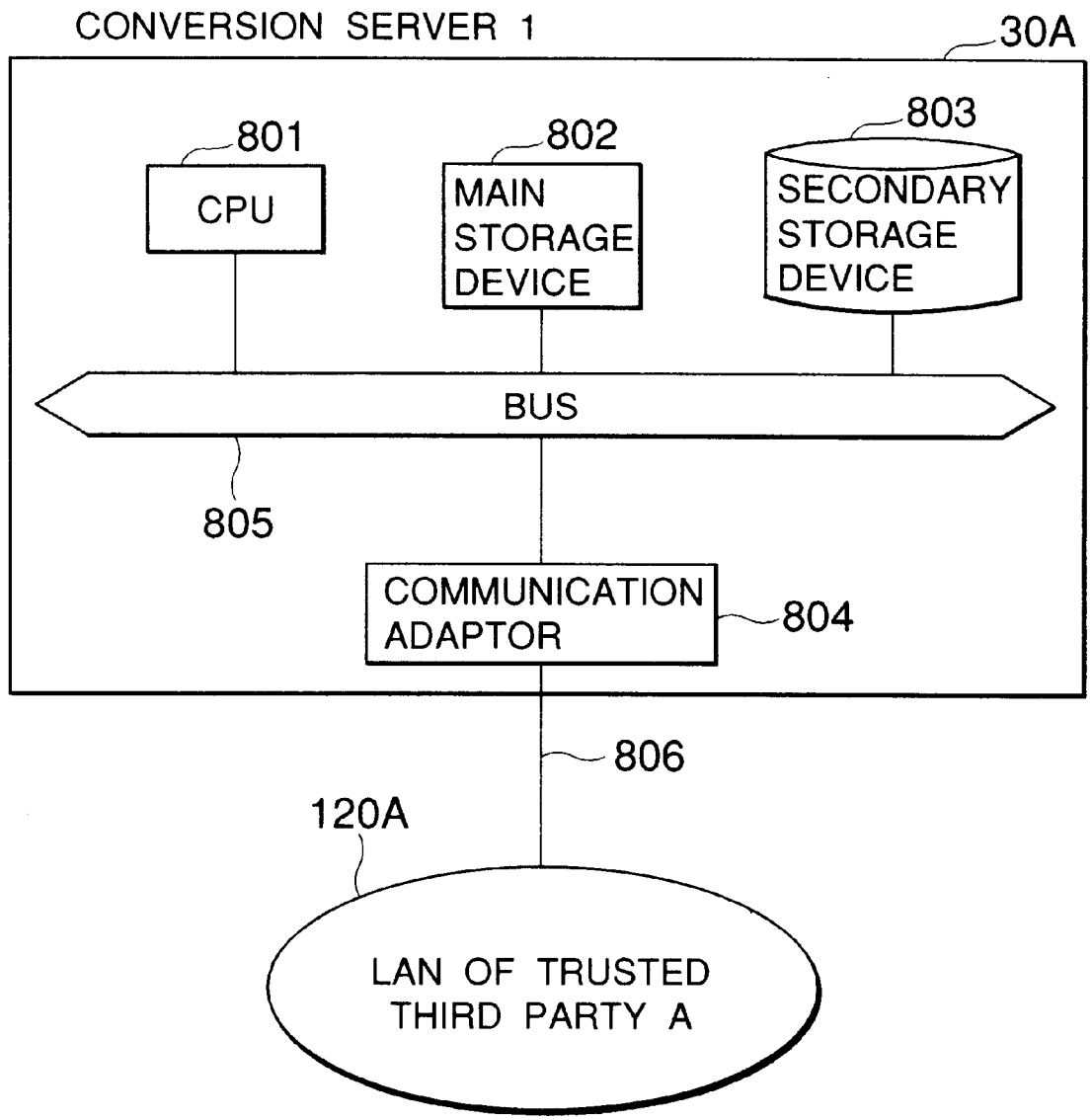
FIG. 8 is a diagram showing a main part of a hardware of a cryptographic protocol conversion server.

FIG. 8 is a diagram showing the main part of the hardware of the cryptographic protocol conversion server 1 (30A).

As shown in FIG. 8, the cryptographic protocol conversion server 1 (30A) includes a CPU 801 for performing an arithmetic and logical operation, a main storage device 802 and a secondary storage device 803 for storing data, a communication adaptor 804 for controlling communication with the outside of the cryptographic protocol conversion server, and a bus 805 for connecting the above elements to one another, and the cryptographic protocol conversion server 1 (30A) is connected to a LAN (120A) of a trusted third party A by a communication line 806 and through the communication adaptor 804.

The main part of the hardware of the cryptographic protocol conversion server 2 (30B) is the same as that of FIG. 8.

Figure 9:
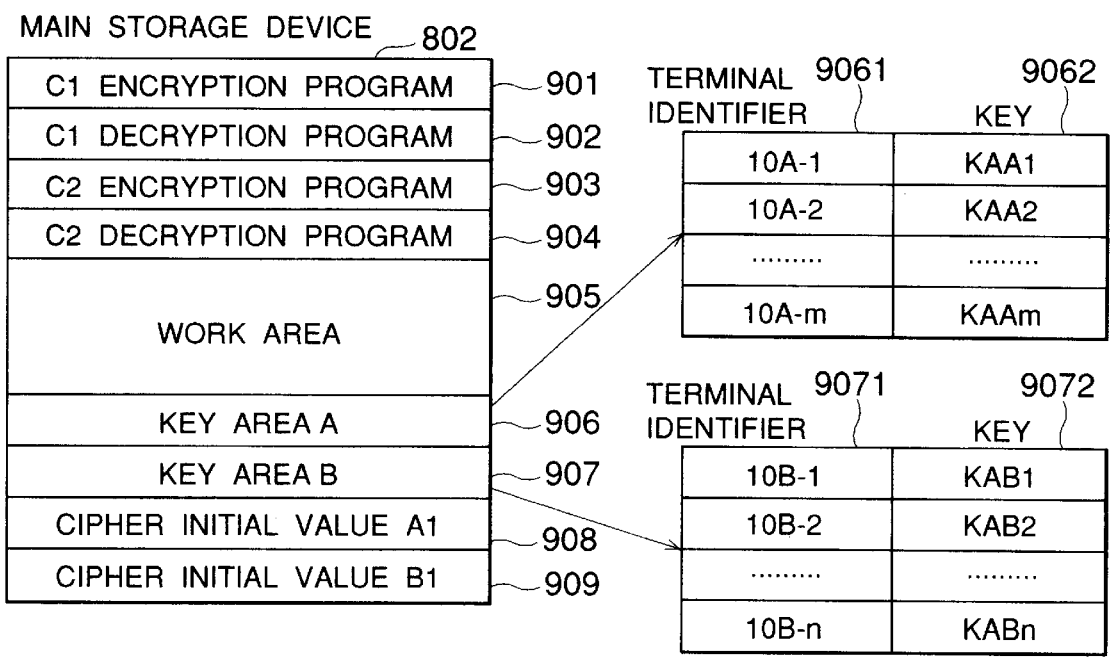
FIG. 9 is a diagram showing a format being used for a main storage device of a cryptographic protocol conversion server.

FIG. 9 is a diagram showing the format of the main storage device 802 of the cryptographic protocol conversion server 1 (30A).

As shown in FIG. 9, in the main storage device 802 there are stored a C1 encryption program 901 and a C1 decryption program 902 which use the cryptographic algorithm C1 used in the LAN-A (100A), and a C2 encryption program 903 and a C2 decryption program 904 which use the cryptographic algorithm C2 used in the LAN-B (100B). Further, a work area 905 is also secured in the main storage device 802.

Further, as information used at the time of cryptographic communication (reception and transmission) there are a key area A (906) in which a key for the cryptographic communication with each of the terminals 10A-1 to 10A-m is set, a key area B (907) in which a key for the cryptographic communication with each of the terminals 10B-1 to 10B-n is set, a cipher initial value A1 (908) and a cipher initial value B1 (909).

Actually, in the key area A (906) a corresponding key 9062 is set for every terminal identifier 9061 of the terminals 10A-1 to 10A-m, and in the key area B (907) a corresponding key 9072 is set for every terminal identifier 9071 of the terminals 10B-1 to 10B-n. In addition, in consideration of security, all the keys which are set in the two key areas 906 and 907 are set to be different from one another.

The cipher initial value A1 (908) is equal to the cipher initial value A1 (307) stored on the main storage device 202 of the terminal 10A-1, and the cipher initial value B1 (909) is equal to a cipher initial value B1 (1207) stored in a main storage device 1102 of the terminal 10B-1, which will be described later with reference to FIG. 12.

The figure showing the format of the main storage device 802 of the cryptographic protocol conversion server 2 (30B) is similar to FIG. 9. However, in consideration of security, all the key stored in the main storage device 802 of the cryptographic protocol conversion server 2 (30B) is different from the key stored in the main storage device 802 of the cryptographic protocol conversion server 1 (30A).

Figure 10:
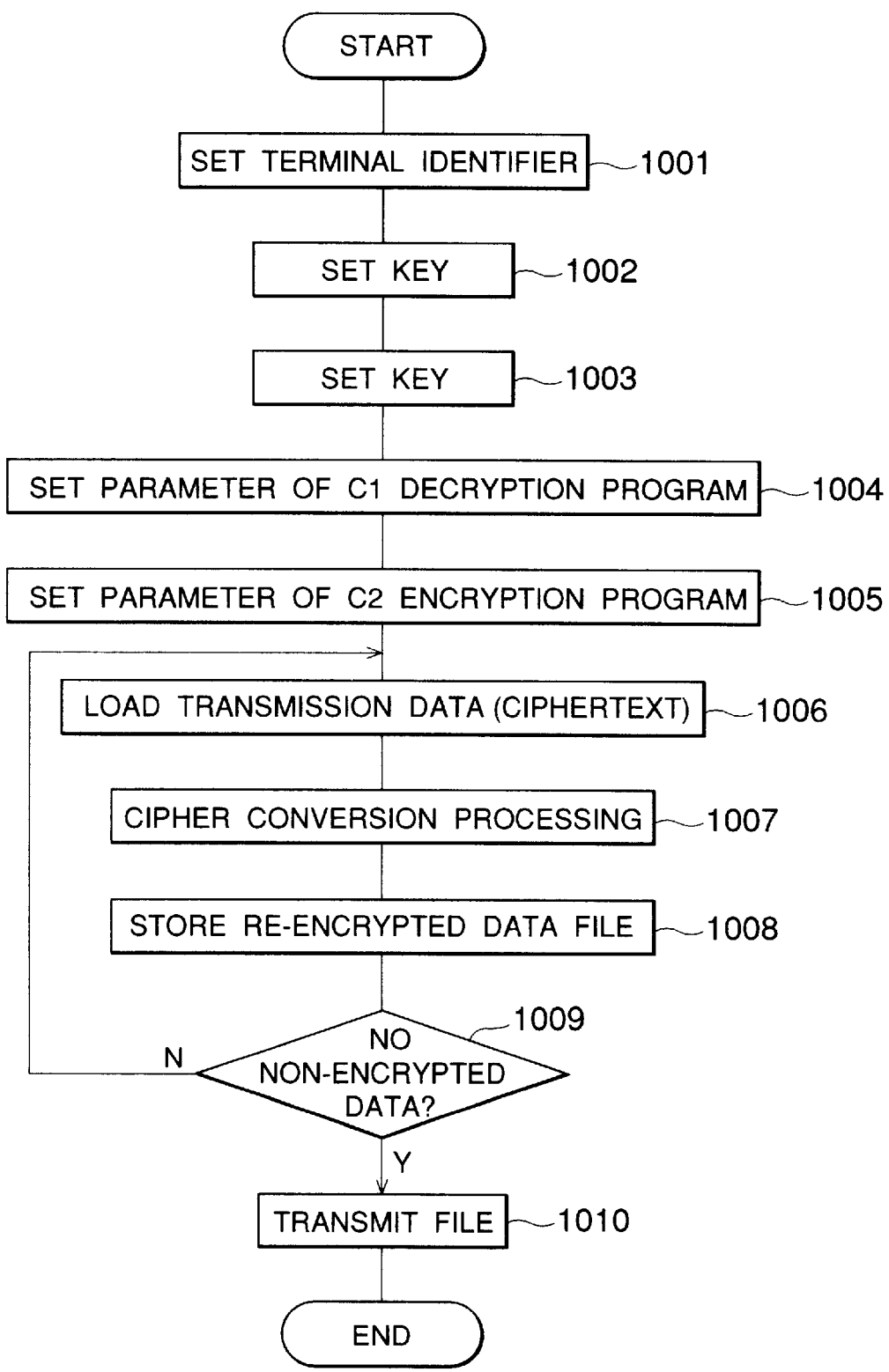
FIG. 10 is a flowchart showing a cipher conversion processing procedure of the cryptographic protocol conversion server.

FIG. 10 is a flowchart showing the cipher conversion processing procedure of the cryptographic protocol conversion server 1 (30A).

In the cryptographic protocol conversion server 1 (30A), data (here, file A1) transmitted from a terminal (here, 10A-1) among the terminals 10A-1 to 10A-m which are connected to the LAN-A (100A) are stored in the secondary storage device 803.

As shown in FIG. 10, the cryptographic protocol conversion server 1 (30A) first reads the terminal identifier 7010 of the terminal 10B-1 serving as a reception terminal (transmission target terminal) and the terminal identifier 7011 of the terminal 10A-1 serving as a transmission terminal from the header information 701 in the file A1 stored in the secondary storage device 803, and sets these terminal identifiers in the work area (step 1001).

Subsequently, the key KAA1 for the cryptographic communication between the transmission terminal 10A-1 and the cryptographic protocol conversion server 1 (30A) is searched and set in the work area 905 by matching the terminal identifier 7011 of the transmission terminal 10A-1 read out in step 1001 and the terminal identifier 9061 set in the key area A (906) (step 1002).

Subsequently, the key KAB1 for the cryptographic communication between the reception terminal 10B-1 and the cryptographic protocol conversion server 1 (30A) is searched and set in the work area 905 by matching the terminal identifier 7010 of the reception terminal 10B-1 read out in step 1001 and the terminal identifier 9071 set in the key area B (907) (step 1003).

Subsequently, the key KAA1 and the cipher initial value a1 (908) which are read out in step 1002 and serve as parameters of the C1 decryption program 902 are set in the work area 905 (step 1004). Further, the key KAB1 and the cipher initial value B1 (909) which are read out in step 1003 and serve as parameters of the C2 encryption program 903 are set in the work area 905 (step 1005). Therefore, the data in the file A are loaded into the work area 905.

Subsequently, the data in the file A1 which are loaded in step 1006 are subjected to the cipher conversion processing (step 1007).

That is, the data loaded in step 1006 are decrypted every block from the head thereof by supplying the parameters set in step 1004 to the C1 decryption program 902 to execute the C1 decryption program 902, and then re-encrypted by supplying the parameters set in step 1005 to the C2 encryption program 903 to execute the C2 encryption program 903. The re-encrypted data are stored at their original position in the work area 905.

When the cipher conversion processing of the step 1007 is completed, the data stored in the work area 905 are stored in the file B1 (step 1008). Subsequently, it is judged whether unconverted data are stored in the file A1 (step 1009). If the unconverted data are stored, the steps 1006 to 1008 are repeated.

Further, if unconverted data are not stored in the file A1, the file B is transmitted through the WAN 110 to the terminal 10B-1 connected to the LAN-B (100B) (step 1010).

The format showing the cipher conversion processing procedure of the cryptographic protocol conversion server 2 (30B) is similar to FIG. 10. That is, the file A2 transmitted from the terminal 10A-1 which is connected to the LAN-A (100A) is converted to the file B2, and then transmitted through the WAN 110 to the terminal 10B-1 connected to the LAN-B (100B).

Next, the operation of the reception terminal 10B-1 will be described.

Figure 11:
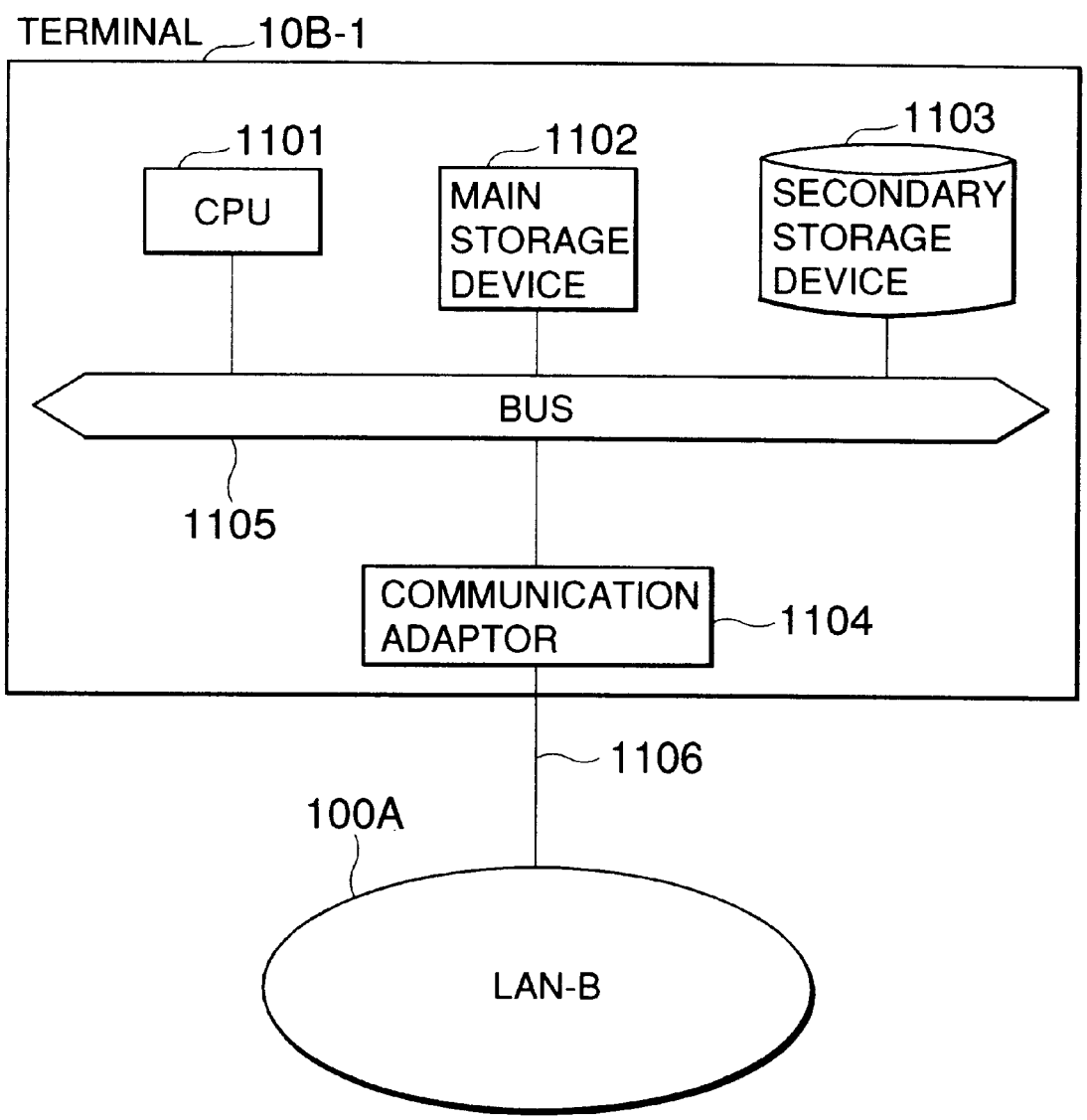
FIG. 11 is a diagram showing a main part of a hardware of a reception terminal.

FIG. 11 is a diagram showing the main part of the hardware of the terminal 10B-1.

As shown in FIG. 11, like the terminal 10A-1, the terminal 10B-1 includes a CPU 1101 for performing arithmetic and logic operations, a main storage device 1102 and a secondary storage device 1103 for storing data, a communication adaptor 1104 for controlling communication with the outside of the terminal, and a bus 1105 for connecting the above elements to one another. The terminal 10B-1 is connected through the communication adaptor 1104 to the LAN-B (100B) by a communication line 1106.

FIG. 12 shows the format of the main storage device 1102 of the terminal 10B-1.

As shown in FIG. 12, in the main storage device 1102 there are stored a C2 encryption program 1201 and a C2 decryption program 1202 using the cryptographic algorithm C2 used in the LAN-B (100B), and a sharing program 1203 for sharing data to be transmitted, and a restoring program 1204 for restoring into original data those data which are transmitted from the cryptographic protocol conversion server 1 (30A) and the cryptographic protocol conversion server 2 (30B). Further, a work area 1205 is secured in the main storage device 1102.

Further, as information used at the time of cryptographic communication (reception and transmission) there are stored a key KAB1 (1206) and a cipher initial value (random number) B1 (1207) for the cryptographic communication with the cryptographic protocol conversion server 1 (30A), a key KBB1 (1208) and a cipher initial value (random number) B2 (1209) for the cryptographic communication with the cryptographic protocol conversion server 2 (30B), the terminal identifier 1210 of the terminal 10B-1 itself, the server identifier 1211 of the cryptographic protocol conversion server 1 (30A), and the server identifier 1212 of the cryptographic protocol conversion server 2 (30B).

Figure 13:
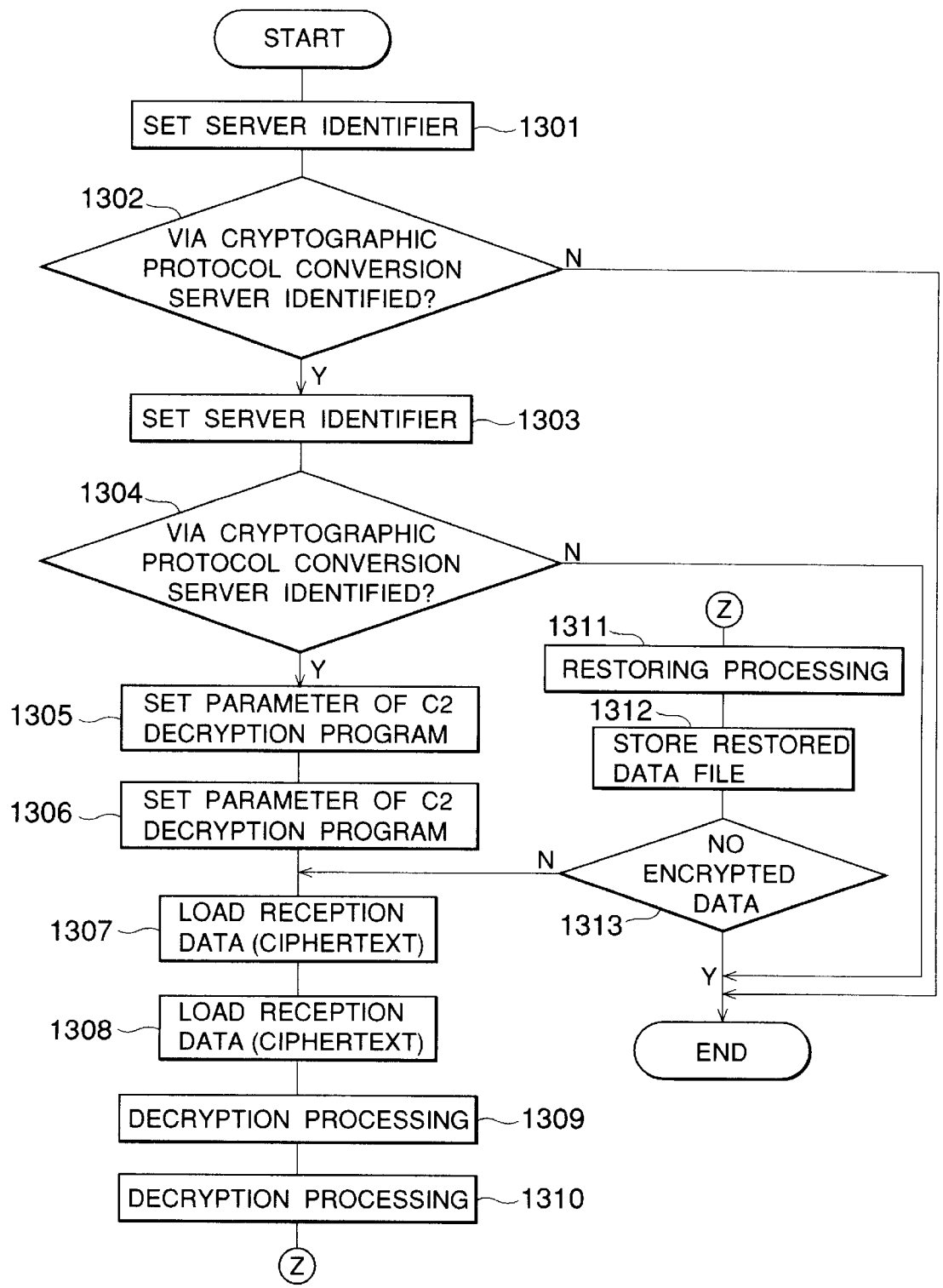
FIG. 13 is a flowchart showing a reception processing procedure of the reception terminal.

FIG. 13 is a flowchart showing the reception processing procedure of the terminal 10B-1.

In the terminal 10B-1, the file (here, file B1) transmitted from the cryptographic protocol conversion server 1 (30A) and the file (here, file B2) transmitted from the cryptographic protocol conversion server 2 (30B) are stored in the secondary storage device 1103.

As shown in FIG. 13, when the reception of the files B1, B2 by the terminal 10B-1 is completed, the terminal 10B-1 first reads out the server identifier 7012 of the cryptographic protocol conversion server (here, the server identifier of the cryptographic protocol conversion server 1 (30A)) from the header information 701 in the file B1 stored in the secondary storage device 1103, and sets it into the work area 1205 (step 1301).

Subsequently, the cryptographic protocol conversion server (here, the cryptographic protocol conversion server 1 (30A)) through which the data are transmitted is identified on the basis of the server identifier of the cryptographic protocol conversion server (here, the server identifier of the cryptographic protocol conversion server 1 (30A)) which has been set in the work area 1205 in step 1301 (step 1302).

Subsequently, the terminal 10B-1 reads out the server identifier 7020 of the cryptographic protocol conversion server (here, the server identifier of the cryptographic protocol conversion server 2 (30B)) from the header information 702 in the file B2 stored in the secondary storage device 1103, and sets it in the work area 1205 (step 1303).

Subsequently, the cryptographic protocol conversion server (here, the cryptographic protocol conversion server 2 (30B)) through which the data are transmitted is identified on the basis of the server identifier of the cryptographic protocol conversion server (here, the server identifier of the cryptographic protocol conversion server 2 (30B)) which has been set in the work area 1205 in step 1303 (step 1304).

Subsequently, the key KAB1 (1206) and the cipher initial value B1 (1207) for the cryptographic communication with the cryptographic protocol conversion server 1 (30A), which serve as parameters of the C2 decryption program 1202, are set in the work area 1205 (step 1305).

Subsequently, the key KBB1 (1208) and the cipher initial value B2 (1209) for the cryptographic communication with the cryptographic protocol conversion server 2 (30B), which serve as parameters of the C2 decryption program 1202, are set in the work area 1205 (step 1306).

Subsequently, the re-encrypted data which are stored in the file B1 on the secondary storage device 1103 are loaded into the work area 1205 (step 1307), and the re-encrypted data which are stored in the file B2 in the secondary storage device 1103 are loaded into the work area 1205 (step 1308). The data amount of the re-encrypted data which are loaded in step 1307 is equal to that of the re-encrypted data which are loaded in step 1308.

Subsequently, the parameters set in step 1305 are supplied to the C2 decryption program 1202 to execute the C2 decryption program 1202 and decrypt the re-encrypted data loaded in step 1307 (step 1309).

Subsequently, the parameters set in step 1306 are supplied to the C2 decryption program 1202 to execute the C2 decryption program 1202 and decrypt the re-encrypted data loaded in step 1308 (step 1310).

Subsequently, the two data items which are decrypted in steps 1309 and 1310 by using the restoring program 1204 are restored into the original data during the restoring processing (step 1311).

Here, a restoring method based on the restoring program will be described with reference to FIG. 14.

In FIG. 14, the exclusive OR operation between the data a received via the cryptographic protocol conversion server 1 (30A) and the data b received via the cryptographic protocol conversion server 2 (30B) is successively performed from the head of the data in accordance with the sharing method shown in FIG. 5, whereby the data a and b are restored to the original data d.

Returning to FIG. 13, the terminal 10B-1 stores the data (plaintext) restored by the restoring processing into the file B in the secondary storage device 1103 (step 1312).

Subsequently, it is judged whether non-decrypted data are stored in the file B1, B2 (step 1313). If some non-decrypted data are stored, the steps 1307 to 1312 are repeated.

Through the above operation, the data created in the transmitting terminal 10A-1 are stored in a recognizable original format (plaintext) into the file B in the reception terminal 10B-1, whereby the cryptographic communication from the terminal 10A-1 to the terminal 10B-1 is completed.

Therefore, according to the cryptographic communication system of this embodiment, the cipher conversion processing is separately carried out by each of the cryptographic protocol conversion server 1 (30A) and the cryptographic protocol conversion server 2 (30B). In addition, method of sharing (dividing) the data among each of the cryptographic protocol conversion servers is devised. Therefore, the original data (plaintext) created by the terminal 10A-1 are not stolen by a third party unless the sharing method is clearly known and the plaintext is leaked simultaneously from the two cryptographic protocol conversion servers 1 (30A) and 2 (30B) during the cipher conversion processing, whereby it is difficult to steel the original data.

Further, according to the cryptographic communication system of this embodiment, each of the cryptographic protocol conversion server 1 (30A) and the cryptographic protocol conversion server 2 (30B) performs the decryption and re-encryption operation for every block in the cipher conversion processing, and the amount of data which are simultaneously set in the plaintext style corresponds to only one block. Therefore, the time for which the data are set in the plaintext style becomes short. Accordingly, the time for which plaintext data may be leaked is shortened, and even when the plaintext data are stolen during this time, data of only one block are known. On the other hand, it is assumed that in the cipher conversion processing all the data are decrypted and returned to original plaintext data and then re-encrypted. The time for which the data are set in the plaintext style is longer, and if the plaintext data are stolen during this time, a larger amount of data are known.

As described above, the decryption and re-encryption operation is performed on a block basis in the cipher conversion processing, and thus the time for which the data are set in the plaintext style becomes shorter. Therefore, security can be enhanced.

In the case shown in FIG. 1, the communication system is designed so that the cryptographic protocol conversion server 1 (30A) and the cryptographic protocol conversion server 2 (30B) are connected to the LAN 120A of the trusted third party A and the LAN 120B of the trusted third party B to enhance the security more. However, both the cryptographic protocol conversion server 1 (30A) and the cryptographic protocol conversion server 2 (30B) may be connected to the WAN 110.

The following modifications may be made to the above embodiment.

(Modification 1)

Figure 18:
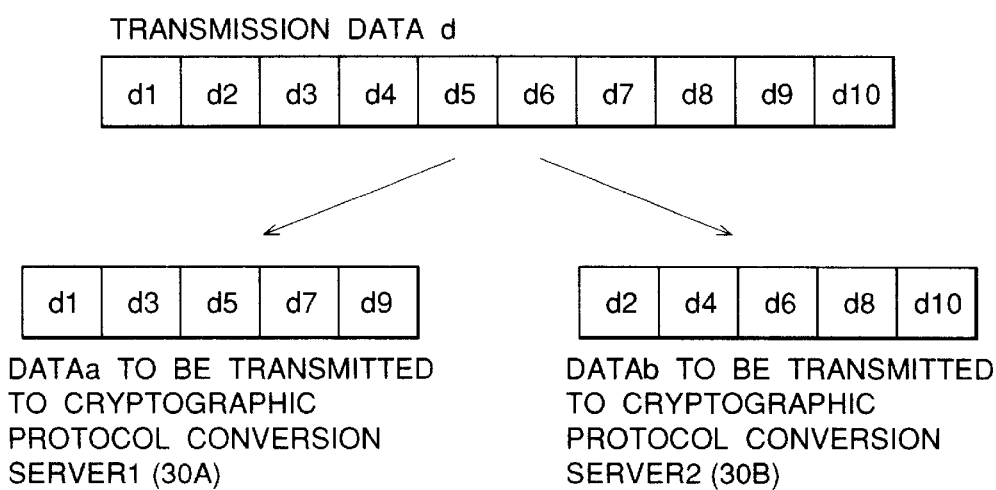
FIG. 18 is a diagram showing a sharing method based on a sharing program.

In place of the sharing method as shown in FIG. 5, the modification 1 utilizes a sharing method shown in FIG. 18.

In the sharing method shown in FIG. 18, the original data d are alternately extracted from the head thereof block by block to generate the data a to be transmitted to the cryptographic protocol conversion server 1 (30A) and the data b to be transmitted to the cryptographic protocol conversion server 2 (30 B).

In this restoring method, the respective data items a and b are decrypted, and then alternately extracted from their heads to link the alternately extracted data.

Each of the two data items a, b which are generated by the sharing method of FIG. 18 has a data amount which is half of that of the original data d, and thus the load of the cipher conversion processing is distributed between the cryptographic protocol conversion server 1 (30A) and the cryptographic protocol conversion server 2 (30B).

Since the data amount of each data a, b to be shared to each of the cryptographic protocol conversion servers 1 (30A) and 2 (30B) is smaller than the data amount of the original data d, a load distribution effect on the cipher conversion processing is obtained, resulting in an effect of increasing the cipher conversion processing speed. Therefore, this embodiment is particularly effective for large-capacity cryptographic communication.

However, in the sharing method shown in FIG. 18, the original data d are transposed on a block basis, so that the plaintext delta before the re-encryption becomes meaningful data (comprehensible data) on a block basis in the cipher conversion processing. Therefore, it is preferable that the block length is sufficiently shortened and the meaning for every block is made incomprehensible. The block length may be set to one block length (64 bits) of a conventional cipher, less than 16 bits or less than 8 bits. Since 16 bits correspond to a Kanji (Chinese character) code of one character, if the block length is set to be less than 16 bits, the data of one block becomes meaningless (incomprehensible). Further, since 8 bits correspond to an alphabetic or numerical code of one character, if the block length is set to be less than 8 bits, the data of one block becomes meaningless.

As described above, if the block length is set to be sufficiently short, it is difficult to understand the meaning of the plaintext data in the cipher conversion processing, resulting in enhancement of the security. (Modification 2)

According to the modification 2, in order to make the data more meaningless (more incomprehensible) compared with the modification 1, each block of the original data d is randomly transposed before the data sharing operation based on the sharing method of FIG. 18 is performed.

For example, assuming that the number of blocks of the original data d is equal to n, there exist (n!−1) transposing methods. Therefore, in order to transpose the data as randomly as possible, the transposition table may be used, and a transmission terminal and a reception terminal may hold the same transposition table.

(Modification 3)

In the case shown in FIG. 1, the two cryptographic protocol conversion servers are connected to one another. In the modification 3, three or more cryptographic protocol conversion servers are connected to one another.

For example, when three cryptographic protocol conversion servers are connected, two data items a and b generated by the sharing method shown in FIG. 5 are substantially equally shared among the three cryptographic protocol conversion servers. That is, for example, two-thirds of the data a from the head thereof, the remaining (one-third) of the data a, one-third of the data b from the head thereof, and the remaining (two-thirds) of the data b may be respectively shared among the three cryptographic protocol conversion servers.

The two data items a and b generated by the sharing method shown in FIG. 5 have the data amount which is double the original data d. Therefore, when three or more cryptographic protocol conversion servers are connected, the load is distributed into these cryptographic protocol conversion servers.

(Modification 4)

In the modification 4, the modification 1 is designed so that three or more cryptographic protocol conversion serves are connected.

For example, when three cryptographic protocol conversion servers are connected, the original data d may be alternately extracted from the head thereof by the sharing method shown in FIG. 18 to generate three data items to the three cryptographic protocol conversion servers.

In the sharing method shown in FIG. 18, when the k cryptographic protocol conversion servers ($\geq 3$) are connected, k data items to be transmitted to each of the k cryptographic protocol conversion servers are generated. Since of each of these k data items has a data amount which is equal to $1/k$ of the original data, d, the load can be distributed into these k cryptographic protocol conversion servers.

(Modification 5)

In the modification 5, the data a and b are generated from the original data d by the sharing method shown in FIG. 5, and data items a1, a2 are generated from the data and the data a and the data items b2 and b2 are generated from the data b, by the same sharing method.

In this case, the data items a1 and b1 may be shared in the cryptographic protocol conversion server A (30A) while the data items a2 and b2 are shared in the cryptographic protocol conversion server B (30B).

In this case, there is no load distribution effect, and rather, the load is doubled. However, if four cryptographic protocol conversion servers are connected, the increase of the load can be suppressed. Further, if five or more cryptographic protocol conversion servers are connected, the load can be distributed.

(Modification 6)

In the embodiment shown in FIG. 1, the terminals 10A-1 to 10A-m which are connected to the LAN-A (100A) and the terminals 10B-1 to 10B-n which are connected to the LAN-B (100B) use the symmetric block ciphers having the same block length. However, in the modification 6, a stream cipher system or a public-key cipher system is used.

According to the symmetric block ciphers, the encryption/decryption operation is performed every relatively long data block of several tens of bits or more. On the other hand, according to the stream cipher system which is one kind of symmetric cryptographic system, the encryption/decryption operation is performed every small data block of one bit to several bits. For example, according to the DES (Data Encryption Standard) cipher among the symmetric block ciphers, the encryption/decryption operation is performed every 64 bits, while according to Multi2 (Multi-Media Encryption Algorithm 2), the encryption/decryption operation is performed every 64 bits. Further, according to a Vernam cipher of a stream cipher system, the encryption/decryption operation is performed every bit.

According to the public-key cipher system, the encryption/decryption operation is performed every very long data block. For example, according to RSA cipher, which is a public-key cipher system, the encryption/decryption operation is performed every 64 bytes (=512 bits).

The details of the DES cipher are described in "Modern Cryptographic Theory" (Institute of Electronics, Information and Communication Engineers of Japan), pp. 41–49, and the details of the RSA cipher are described in "Modern Cryptographic Theory" (Institute of Electronics, Information and Communication Engineers of Japan), pp 105–123. Further, the details of the Multi2 cipher are described in "Development of Multi-Media Encryption Algorithm Hisecurity-Multi2 and Its Operation Mode" (Institute of Electronics, Information and Communication Engineers of Japan, Proceedings of the 1989 Joint Workshop on Information Theory and Its Applications, Cryptography and Information Security), pp 167–173.

For example, when the terminals 10A-1 to 10A-m connected to the LAN-A (100A) use the Vernam cipher while the terminals 10B-1 to 10B-n connected to the LAN-B (100B) use the DES cipher, in the cipher conversion processing, 64 bits may be re-encrypted according to the DES cipher every time 64 bits are decrypted bit by bit according to the Vernam cipher.

Further, for example, when the terminals 10A-1 to 10A-m connected to the LAN-A (100A) use the RSA cipher while the terminals 10B-1 to 10B-n connected to the LAN-B (100B) use the DES cipher, in the cipher conversion processing, 64 bytes may be re-encrypted every 64 bits according to the DES cipher every time 64 bytes are decrypted according to the RSA cipher.

Still further, for example, when the terminals 10A-1 to 10A-m connected to the LAN-A (100A) use the RSA cipher while the terminals 10B-1 to 10B-n connected to the LAN-B (100B) use the Vernam cipher, in the cipher conversion processing, 64 bytes may be re-encrypted bit by bit according to the Vernam cipher every time 64 bytes are decrypted according to the RSA cipher.

In the case where it is required to perform the cryptographic communication between terminals of different countries which use different cipher types, there may be considered such a situation that at least one country legally regulates the import and export on cipher techniques, and thus a cryptographic algorithm used by a terminal of the legally regulating country cannot be provided to a cryptographic protocol conversion server of another country. For example, when at least one of the cryptographic protocol conversion server 1 (30A) and the cryptographic protocol conversion server 2 (30B) is located out of a legally regulating country, the cryptographic protocol conversion server concerned cannot be provided to the cryptographic algorithm used in terminals of the legally regulating country.

Therefore, in such a situation, in order to enable the cryptographic communication between terminals of two countries, it is generally expected that the two countries make such an agreement that only a special cipher is commonly used between the countries. Such a cipher as is commonly used between two countries is called an "intermediate cipher".

Therefore, an embodiment under such a situation that an agreement on use of an intermediate cipher is made will be described as a second embodiment.

Figure 15:
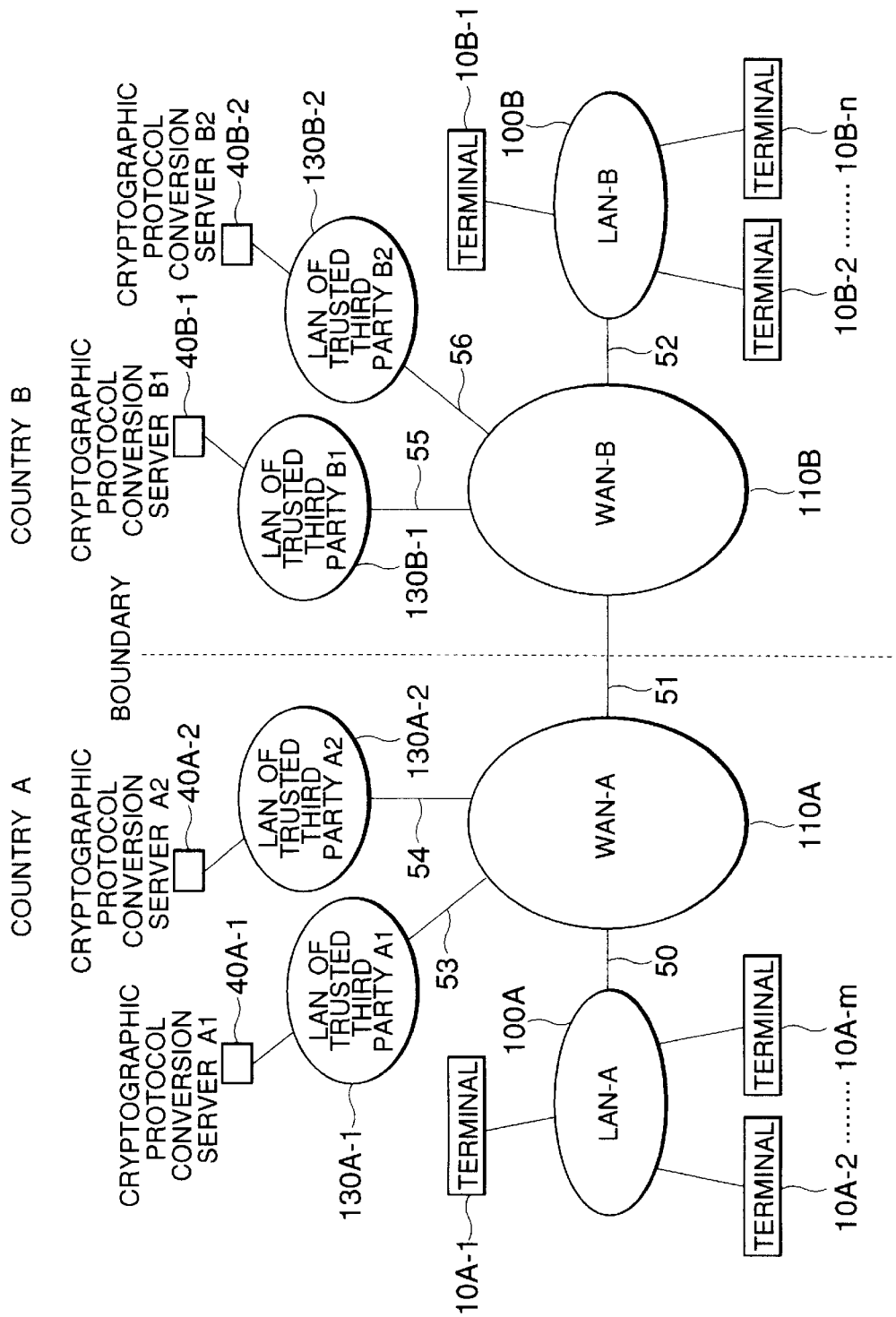
FIG. 15 is a diagram showing a cryptographic communication system according to a second embodiment of the present invention.

FIG. 15 shows the cryptographic communication system according to a second embodiment of the present invention.

The cryptographic communication system shown in FIG. 15 is used to perform the cryptographic communication between any terminals connected to the LAN-A (100A) and the LAN-B (100B) respectively, the LAN-A (100A) belonging to a country A and using a cipher type used in the country A, and the LAN-B (100B) belonging to a country B and using a cipher type used in the country B.

The cryptographic communication is performed through a WAN-A (110A), a cryptographic protocol conversion server A1 (40A-1) and a cryptographic protocol conversion server A2 (40A-2) which belong to the country A, and a WAN-B (110B), a cryptographic protocol conversion server B1 (40B-1) and a cryptographic protocol conversion server B2 (40B-2) which belong to the country B.

As shown in FIG. 15, the LAN-A (100A) is a local area network to which plural terminals 10A-1 to 10A-m are connected, and it is connected to the WAN-A (110A) in the country A through a communication line 50. The LAN-B (100B) is a local area network to which plural terminals 10B-1 to 10B-n are connected, and it is connected to the WAN-B (110B) in the country B through a communication line 52. Further, the WAN-A (110A) in the country A and the WAN-B (110B) in the country B are connected to each other through a communication line 51.

The cryptographic protocol conversion server A1 (40A-1) and the cryptographic protocol conversion server A2 (40A-2) are disposed in the country A, and each of the servers is provided with a cryptographic algorithm C1 and a cryptographic algorithm of an intermediate cipher. Further, the cryptographic protocol conversion server A1 (40A-1) and the cryptographic protocol conversion server A2 (40A-2) belong to a LAN (130A-1) of a trusted third party A1 and a LAN (130A-2) of a trusted third party A2 respectively, and each of the LAN (130A-1) and the LAN (130A-2) is connected to the WAN-A (110A) through communication lines 53 and 54.

The cryptographic protocol conversion server B1 (40B-1) and the cryptographic protocol conversion server B2 (40B-2) are disposed in the country B, and each of the servers is provided with a cryptographic algorithm C2 and an algorithm of the intermediate cipher. The cryptographic protocol conversion server B1 (40B-1) and the cryptographic protocol conversion server B2 (40B-2) belong to a LAN (130B-1) of a trusted third party B1 and a LAN (130B-2) of a trusted third party B2 respectively, and each of the LAN (130B-1) and the LAN (130B-2) is connected to the WAN-B (110B) through communication lines 55 and 56.

The detailed operation of the cryptographic communication system, concentrating on different points from the cryptographic communication system as described above, will be described by using the cryptographic communication from the terminals 10A-1 connected to the LAN-A (100A) to the terminal 10B-1 connected to the LAN-B (100B).

The diagram of the main part of the hardware of the terminal 10A-1 is the same as FIG. 2, and the diagram of the main part of the hardware of the terminal 10B-1 is the same as FIG. 11. Further, the diagram of the format of the main storage device 202 of the terminal 10A-1 and the flowchart of the transmission processing procedure of the terminal 10A-1 are substantially the same as FIGS. 3 and 4.

In the terminal 10A-1, the cryptographic protocol conversion server 1 (30A) in the cryptographic communication system as described above is regarded as the cryptographic protocol conversion server A1 (40A-1), and the cryptographic protocol conversion server 2 (30B) is regarded as the cryptographic protocol conversion server A2 (40A-2). That is, the terminal 10A-1 transmits data to be transmitted to the terminal 10B-1 while sharing the data among each of the cryptographic protocol conversion server A1 (40A-1) and the cryptographic protocol conversion server A2 (40A-2) and encrypting the shared data.

Further, the diagram of the format of the main storage device 1102 of the terminal 10B-1 and the flowchart of the transmission processing procedure of the terminal 10B-1 are substantially the same as FIGS. 12 and 13.

However, in the terminal 10B-1, the cryptographic protocol conversion server 1 (30A) in the cryptographic communication system as described above is regarded as the cryptographic protocol conversion server B1 (40B-1), and the cryptographic protocol conversion server 2 (30B) in the cryptographic communication system as described above is regarded as the cryptographic protocol conversion server B2 (40B-2). That is, the data which are transmitted via each of the cryptographic protocol conversion server B1 (40B-1) and the cryptographic protocol conversion server B2 (40B-2) are decrypted and restored to the original data.

The diagram of the cryptographic protocol conversion server A1 (40A-1), the diagram of the cryptographic protocol conversion server A2 (40A-2), the diagram of the cryptographic protocol conversion server B1 (40B-1) and the diagram of the cryptographic protocol conversion server B2 (40B-2) are the same as FIG. 8.

Figure 16:
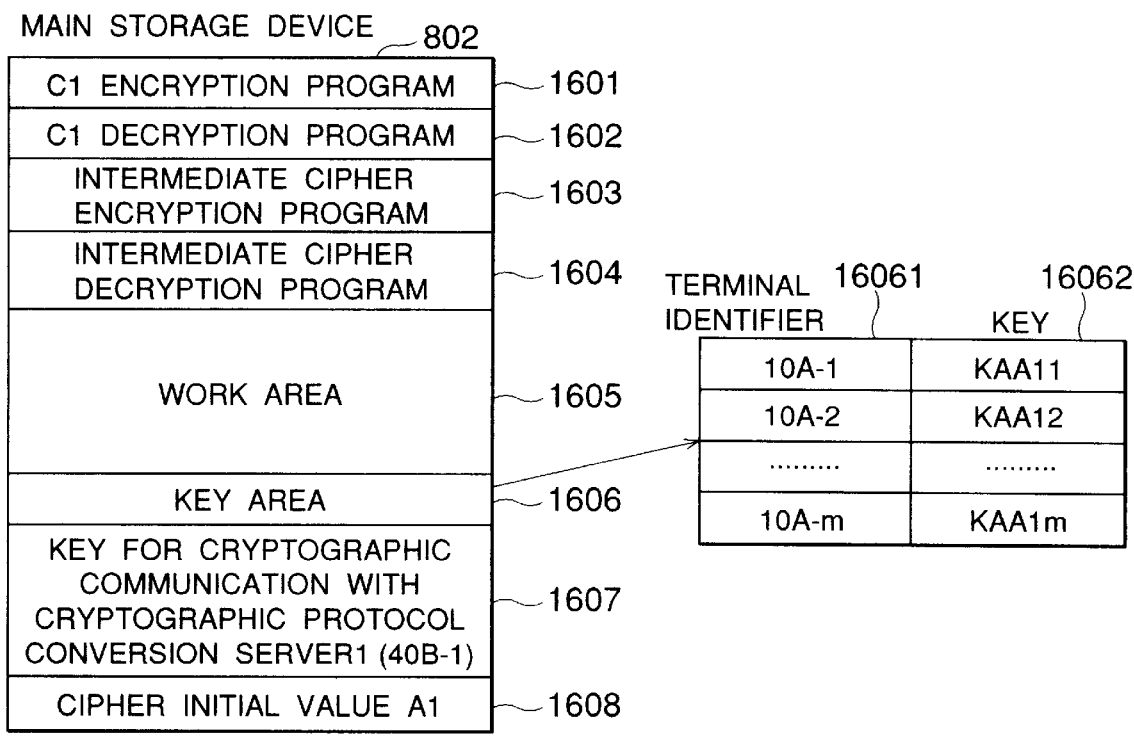
FIG. 16 is a diagram showing a format being used for a main storage device of a cryptographic protocol conversion server in a country A.

FIG. 16 shows a format used for a main storage device 802 of the cryptographic protocol conversion server A1 (40A-1).

As shown in FIG. 16, in the main storage device 802 are stored a C1 encryption program 1601 and a C1 decryption program 1602 which use the cryptographic algorithm C1 used in the LAN-A (100A), and an intermediate cipher encryption program 1603 and an intermediate cipher decryption program 1604 which use the cryptographic algorithm of the intermediate cipher. A work area 1605 is also secured in the main storage device.

Further, as information used at the time of cryptographic communication (reception and transmission) there are stored a key area 1606 in which a key for the cryptographic communication with each of the terminals 10A-1 to 10A-m is set, a key 1607 for the cryptographic communication with the cryptographic protocol conversion server B1 (40B-1), and a cipher initial value A1 (1608).

Actually, a corresponding key 16062 is set for every terminal identifier 16061 of the terminal 10A-1 to 10A-m in the key area 1606. The cipher initial value A1 (1608) is equal to the cipher initial value A1 (307) stored in the main storage device 202 of the terminal 10A-1.

The diagram of the format of the main storage device 802 of the cryptographic protocol conversion server A2 (40A-2) is also the same as FIG. 16. However, the key for the communication with the cryptographic protocol conversion server B2 (40B-2) is stored in place of the key for the cryptographic communication with the cryptographic protocol conversion server B1 (40B-1).

Figure 17:
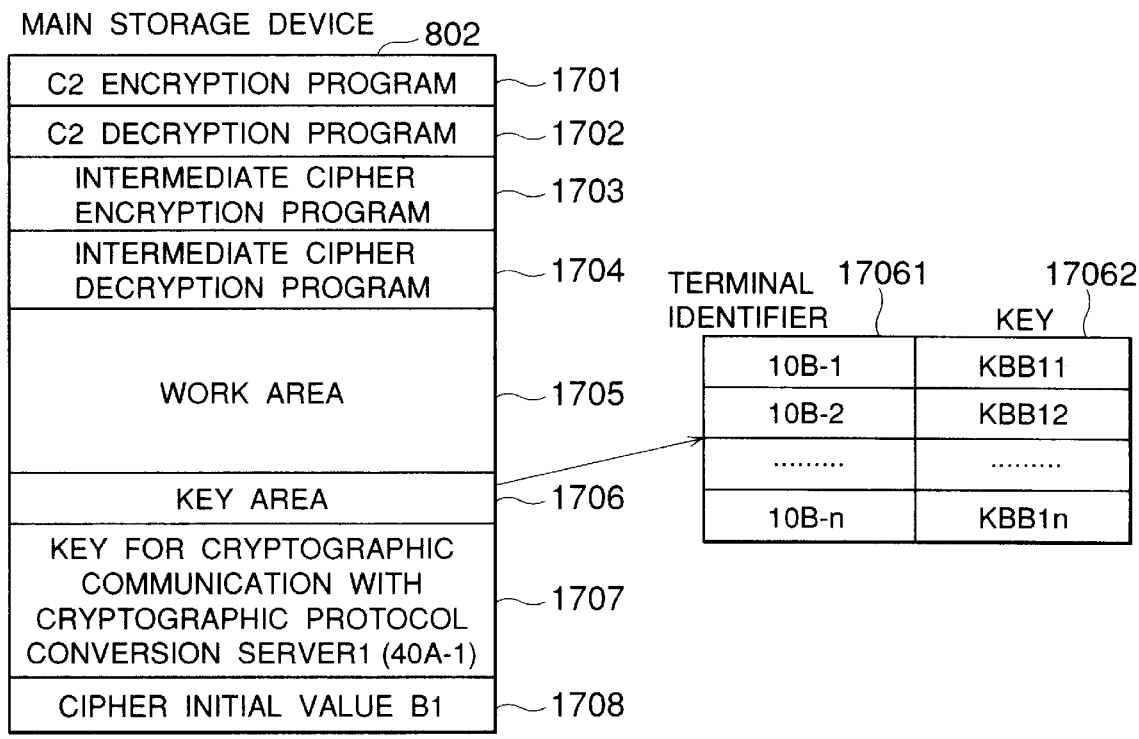
FIG. 17 is a diagram showing a format being used for a main storage device of a cryptographic protocol conversion server in a country B.

FIG. 17 is a diagram showing the format of the main storage device 802 of the cryptographic protocol conversion server B1 (40B-1 ).

As shown in FIG. 17, in the main storage device 802 there are stored a C2 encryption program 1701 and a C2 decryption program 1702 which use the cryptographic algorithm C2 used in the LAN-B (100B), and an intermediate cipher encryption program 1703 and an intermediate cipher decryption program 1704 which use the cryptographic algorithm of the intermediate cipher. A work area 1705 is also secured in the main storage device 802.

Further, as information used at the time of cryptographic communication (reception and transmission) there are stored a key area 1706 in which a key for the cryptographic communication with each of the terminals 10B-1 to 10B-n, a key 1707 for the cryptographic communication with the cryptographic protocol conversion server A1 (40A-1), and a cipher initial value B1 (1708) are set.

Actually, a corresponding key 17062 is set for every terminal identifier 17061 of the terminal 10B-1 to 10B-n in the key area 1706. Further, the cipher initial value B1 (1708) is equal to the cipher initial value B1 (1107) stored in the main storage device 1102 of the terminal 10B-1.

The diagram of the format of the main storage device 802 of the cryptographic protocol conversion server B2 is also the same as FIG. 17. However, the key for the cryptographic communication with the cryptographic protocol conversion server A2 (40A-2) is stored in place of the key for the cryptographic communication with the cryptographic protocol conversion server A1 (40A-1).

The cipher conversion processing procedure of the cryptographic protocol conversion server A1 (40A-1) and the cryptographic protocol conversion server A2 (40A-2) is substantially the same as FIG. 10.

However, in the cipher conversion processing, each of the cryptographic protocol conversion server A1 (40A-1) and the cryptographic protocol conversion server A2 (40A-2) decrypts the data according to the C1 decryption program 1602, and then re-encrypting the decrypted data according to the intermediate cipher encryption program 1603 in place of decryption the data according to the C1 decryption program 902 and then re-encrypts the decrypted data according to the C2 encryption program 903. The cryptographic protocol conversion server A1 (40A-1) transmits to the cryptographic protocol conversion server B1 (40B-1), a file in which the re-encrypted data are stored, and the cryptographic protocol conversion server A2 (40A-2) transmits, to the cryptographic protocol conversion server B2 (40B-2), a file in which the re-encrypted data are stored.

In this case, the cryptographic communication using the intermediate cipher is performed between the cryptographic protocol conversion server A1 (40A-1) and the cryptographic protocol conversion server B1 (40B-1), and the cryptographic communication using the intermediate cipher is performed between the cryptographic protocol conversion server A2 (40A-2) and the cryptographic protocol conversion server B2 (40B-2). At any rate, the system may be designed so that overlapping transmission to one cryptographic protocol conversion server is avoided.

Further, the cipher conversion processing procedure of the cryptographic protocol conversion server B1 (40B-1) and the cryptographic protocol conversion server B2 (40B-2) is substantially the same as FIG. 10. However, in the cipher conversion processing, the cryptographic protocol conversion server B1 (40B-1) and the cryptographic protocol conversion server B2 (40B-2) decrypts the data according to the intermediate cipher decryption program 1704, and then re-encrypts the decrypted data according to the C2 encryption program 1701 in place of decryption the data according to the C1 decryption program 902 and then re-encrypting the decrypted data according to the C2 encryption program 903.

As described above, when the agreement on use of the intermediate cipher is made, each of the cryptographic protocol conversion server A1(40A-1) and the cryptographic protocol conversion server A2 (40A-2) may hold the key 1607 for the cryptographic communication with the cryptographic protocol conversion server B1 (40B-1) and the cryptographic protocol conversion server B2 (40B-2), and the key 16062 for the cryptographic communication with each of the terminals 10A-1 to 10A-m connected to the LAN-A (100A), and it is unnecessary for each server to hold the key 17062 for the cryptographic communication with the each of the terminals 10B-1 to 10B-n connected to the LAN-B (100B). Further, each of the cryptographic protocol conversion server B1 (40B-1) and the cryptographic protocol conversion server B2 (40B-2) may hold the key 1707 for the cryptographic communication with the cryptographic protocol conversion server A1 (40A-1) and the cryptographic protocol conversion server A2 (40A-2), and the key 17062 for the cryptographic communication with each of the terminals 10B-1 to 10B-n connected to the LAN-B (100B), and it is unnecessary to hold the key 16062 for the cryptographic communication with each of the terminals 10A-1 to 10A-m connected to the LAN-A (100A).

Accordingly, the cryptographic communication can be performed between two countries even when a cryptographic algorithm used in one country is not provided to a cryptographic protocol conversion server belonging to the other country.

In the case shown in FIG. 15, the cryptographic protocol conversion server A1 (40A-1) and the cryptographic protocol conversion server A2 (40A-2) are connected to the LAN (130A-1) of the trusted third party A1 and the LAN (130A-2) of the trusted third party A2 respectively, and the cryptographic protocol conversion server B1 (40B-1) and the cryptographic protocol conversion server B2 (40B-2) are connected to the LAN (130B-1) of the trusted third party B1 and the LAN (130B-2) of the trusted third party B2 respectively, whereby the security can be more greatly enhanced. However, both of the cryptographic protocol conversion server A1 (40A-1) and the cryptographic protocol conversion server A2 (40A-2) may be connected to the WAN-A (110A) while both of the cryptographic protocol conversion server B1 (40B-1) and the cryptographic protocol conversion server B2 (40B-2) are connected to the WAN-B (110B).

The same modifications as described above may be considered even when the agreement on the use of the intermediate cipher is made.

That is, like the above-described modification 1, the sharing method shown in FIG. 18 may be used in place of the sharing method shown in FIG. 5.

Further, like the above-described modification 2, each block of the original data d may be randomly transposed before the sharing method shown in FIG. 18 is performed.

Like the above-described modification 3, three or more cryptographic protocol conversion servers which belong to each of the country A and the country B may be connected to one another.

Like the above-described modification 4, three or more cryptographic protocol conversion servers which belong to each of the country A and the country B in the modification 1 may be connected to one another.

Like the above-described modification 5, the data a, b are generated from the original data d by the sharing method shown in FIG. 5. The data a1, a2 are generated from the data a and the data b1, b2 are generated from the data b by the same sharing method, Like the above-described modification 6, the terminals 10A-1 to 10A-m connected to the LAN-A (100A) and the terminals 10B-1 to 10B-n connected to the LAN-B (100B) may use the stream cipher system or the public-key cipher system.

As described above, according to the cryptographic communication system of the present invention, a transmission terminal generates, from data to be transmitted, plural data items which are incomprehensible in the plaintext style, and encrypts the plural generated data. Therefore, the transmission terminal shares the data thus encrypted among plural cryptographic protocol conversion servers and then transmits the data. Therefore, the cipher conversion processing is performed by the plural cryptographic protocol conversion servers while being distributed into these servers. Further, each cryptographic protocol conversion server may perform the cipher conversion processing for every fixed data amount. Therefore, the cipher conversion processing when the cryptographic communication is performed between terminals using different cipher types can be performed with security.

Further, if a transmission terminal generates, from the data to be transmitted, plural data items each of which has a smaller data amount than the data amount of the original data, the load can be distributed into the plural cryptographic protocol conversion servers, and thus the load of the cipher conversion processing to be performed by each cryptographic protocol conversion server can be reduced, so that the cipher conversion processing when the cryptographic communication is performed between terminals using different cipher types can be performed at high speed.

Still further, even in the case where terminals using different cipher types belong to different countries, the cipher conversion processing when the cryptographic communication can be performed between the terminals using the different cipher types can be performed with security if these countries make such an agreement that one cipher type is commonly used among these countries, and data to be communicated beyond the boundaries of these countries are encrypted according to the common cipher type.

What is claimed is:

1. A cryptographic communication system including at least one of first type terminals using a first cipher type, at least one of second type terminals using a second cipher type different from the first cipher type, and n cryptographic protocol conversion servers ($n \geq 2$) using the first and second cipher types, said first type terminals, said second type terminals and said cryptographic protocol conversion servers being connected to one another through at least one of networks; wherein said first type terminal includes:
dividing means for dividing data to be transmitted to a terminal of said second type terminals into k items of data to be distributed among k cryptographic protocol conversion servers ($n \geq k \geq 2$) of said n cryptographic protocol conversion servers on the basis of the data to be transmitted to a terminal of said second type terminals;

encryption means for encrypting the k items of data generated by said dividing means according to the first cipher type; and transmitting means for adding terminal information representing each of said first type terminals and said second type terminals to each of said k items of data encrypted by said encryption means and then transmitting said k items of data encrypted to said k cryptographic protocol conversion servers respectively, via said at least one of networks;

each of said k cryptographic protocol conversion servers includes:

cipher conversion means for decrypting said one data item of data encrypted according to the first cipher type, which was transmitted from said first type terminals via said at least one of networks, and then re-encrypting the decrypted data item according to the second cipher type; and transmitting means for transmitting the one data item re-encrypted by said cipher conversion means to said second type terminal which is indicated by the terminal information added to the data; and said second type terminal includes:

decryption means for decrypting the k items of data transmitted from each of said k cryptographic protocol conversion servers according to the second cipher type; and restoring means for restoring original data from the k items of data decrypted by said decryption means.

2. The cryptographic communication system as claimed in claim 1, wherein said dividing means generates k items of data having the same data amount, each of which has a smaller data amount than that of the data before the k items of data are generated.

3. The cryptographic communication system as claimed in claim 1, wherein said dividing means generates k items of data which will have the same data amount as original data before the k items of data are generated when an exclusive OR operation is performed on the k items of data.

4. The cryptographic communication system as claimed in claim 1, wherein said dividing means generates k items of data by successively allocating original data before the generation of the k items of data every fixed data amount.

5. The cryptographic communication system as claimed in claim 4, wherein when the data before the generation of the k items of data represent a character array, the fixed data amount is smaller than the data amount of one character.

6. The cryptographic communication system as claimed in claim 1, wherein said dividing means scrambles the data before the generation of the k items of data every fixed data amount, and then generates the k items of data from the scrambled data.

7. The cryptographic communication system as claimed in claim 6, wherein when the data before the generation of the k items of data represent a character array, the fixed data amount is smaller than the data amount of one character.

8. The cryptographic communication system as claimed in claim 1, wherein said cipher conversion means performs the decryption/re-encryption operation every fixed data amount.

9. A cryptographic communication system including at least one of first type terminals using a first cipher type, at least one of second type terminals using a second cipher type different from the first cipher type, and n cryptographic protocol conversion servers (n≧2) using the first and second cipher types, said first type terminals, said second type terminals and said cryptographic protocol conversion servers being connected to one another through at least one of networks; wherein said first type terminal includes:

dividing means for dividing data to be transmitted to a terminal of said second type terminals into k items of data to be distributed among k cryptographic protocol conversion servers (n≧k≧2) of said n cryptographic protocol conversion servers on the basis of the data to be transmitted to a terminal of said second type terminals, encryption means for encrypting the k items of data generated by said dividing means according to the first cipher type, transmitting means for adding terminal information representing each of said first type terminals and said second type terminals to each of said k items of data encrypted by said encryption means, and then transmitting said k items of data encrypted to said k cryptographic protocol conversion servers respectively, via said at least one of networks, decryption means for decrypting the k items of data transmitted from each of said k cryptographic protocol conversion servers according to the first cipher type, and restoring means for restoring original data from the k items of data decrypted by said decryption means;

said second type terminal includes:

dividing means for dividing data to be transmitted to a terminal of said first type terminals into k items of data to be shared among k cryptographic protocol conversion servers (n≧k≧2) of said n cryptographic protocol conversion servers on the basis of the data to be transmitted to a terminal of said first type terminals, encryption means for encrypting the k items of data generated by said sharing means according to the second cipher type, transmitting means for adding terminal information representing each of said second type terminals and said second type terminals to each of said k items of data encrypted by said encryption means, and then transmitting said k items of data encrypted to said k cryptographic protocol conversion servers respectively, via said at least one of networks decryption means for decrypting the k items of data transmitted from each of said k cryptographic protocol conversion servers according to the second cipher type, and restoring means for restoring original data from the k items of data decrypted by said decryption means; and each of the n cryptographic protocol conversion servers includes:

cipher conversion means for decrypting one data item transmitted from any one of said first type terminals and said second type terminals according to the cipher type of the first and second cipher types which is used by a transmission terminal indicated by the terminal information added to the data, and then re-encrypting the data according to the cipher type of the first and second cipher types which is used by a reception terminal indicated by the terminal information added to the data, and transmitting means for transmitting one data item re-encrypted by said cipher conversion means to the reception terminal indicated by the terminal information added to the data.

10. The cryptographic communication system as claimed in claim 9, wherein said dividing means generates k items of data having the same data amount, each of which has a smaller data amount than that of the data before the k items of data are generated.

11. The cryptographic communication system as claimed in claim 9, wherein said dividing means generates k items of data which will have the same data amount as original data before the k items of data are generated when an exclusive OR operation is performed on the k items of data.

12. The cryptographic communication system as claimed in claim 9, wherein said dividing means generates k items of data by successively allocating original data before the generation of the k items of data every fixed data amount.

13. The cryptographic communication system as claimed in claim 12, wherein when the data before the generation of the k items of data represent a character array, the fixed data amount is smaller than the data amount of one character.

14. The cryptographic communication system as claimed in claim 9, wherein said dividing means scrambles the data before the generation of the k items of data every fixed data amount, and then generates the k items of data from the scrambled data.

15. The cryptographic communication system as claimed in claim 14, wherein when the data before the generation of the k items of data represent a character array, the fixed data amount is smaller than the data amount of one character.

16. The cryptographic communication system as claimed in claim 9, wherein said cipher conversion means performs the decryption/re-encryption operation every fixed data amount.

17. A cryptographic communication system including at least one of first type terminals using a first cipher type, at least one of second type terminals using a second cipher type different from the first cipher type, n first type cryptographic protocol conversion servers ($n \geq 2$) using a third cipher type which is different from the first and second cipher types, and n second type cryptographic protocol conversion servers ($n \geq 2$) which use the second and third cipher types and each of which beforehand corresponds to each of the n first type cryptographic protocol servers, said first and second type terminals and said first and second type cryptographic protocol conversion servers being connected to one another through at least one of networks; wherein each of said first type terminals includes:
dividing means for dividing data to be transmitted into k items of data to be distributed among any of k independent cryptographic protocol conversion servers ($n \geq k \geq 2$) of the n first type cryptographic protocol conversion servers on the basis of the data to be transmitted to a terminal of the second type terminals,
encryption means for encrypting the k items of data generated by said dividing means according to the first cipher type,
transmitting means for adding terminal information representing a transmission terminal and a reception terminal to the k items of data encrypted by said encryption means, and then transmitting said k items of data encrypted to the k first type cryptographic protocol conversion servers,
decryption means for decrypting the k items of data transmitted from each of said k first type cryptographic protocol conversion servers according to the first cipher type, and
restoring means for restoring original data from the k items of data decrypted by said decryption means;

each of said second type terminals includes:
dividing means for dividing data to be transmitted into k items of data to be distributed among any of k independent cryptographic protocol conversion servers ($n \geq k \geq 2$) of said n second type cryptographic protocol conversion servers on the basis of the data to be transmitted to a terminal of said first type terminals,
encryption means for encrypting the k items of data generated by said dividing means according to said second cipher type,
transmitting means for adding terminal information representing a transmission terminal and a reception terminal to the k items of data encrypted by said encryption means, and then transmitting said k items of data encrypted to said k second type cryptographic protocol conversion servers,
decryption means for decrypting the k items of data transmitted from each of said k second type cryptographic protocol conversion servers according to the second cipher type, and
restoring means for restoring original data from the k items of data decrypted by the decryption means;

each of said n first type cryptographic protocol conversion servers includes:
cipher conversion means for decrypting one data item transmitted from any one of said first type terminals according to the first cipher type and then re-encrypting the data according to the third cipher type and for decrypting one data item transmitted. from a corresponding one cryptographic protocol conversion server of said n second type cryptographic protocol conversion servers according to the third cipher type and then re-encrypting the data according to the first cipher type, and
transmitting means for transmitting one data item re-encrypted according to the third cipher type by said cipher conversion means to a corresponding one cryptographic protocol conversion server of said n second type cryptographic protocol conversion servers and for transmitting one data item re-encrypted according to the first cipher type by said cipher conversion means to a reception terminal indicated by the terminal information added to the data; and each of said n second type cryptographic protocol conversion servers includes:
cipher conversion means for decrypting one data item transmitted from any one of the second type terminals according to the second cipher type and then re-encrypting the data according to the third cipher type and for decrypting one data item transmitted from a corresponding one cryptographic protocol conversion server of said n first type cryptographic protocol conversion servers according to the third cipher type and then re-encrypting the data according to the second cipher type, and
transmitting means for transmitting one data item re-encrypted according to the third cipher type by said cipher conversion means to corresponding one cryptographic protocol conversion server of said n first type cryptographic protocol conversion servers and for transmitting one data item re-encrypted according to the second cipher type by said cipher conversion means to a reception terminal indicated by the terminal information added to the data.

18. The cryptographic communication system as claimed in claim 17, wherein said dividing means generates k items of data having the same data amount, each of which has a smaller data amount than that of the data before the k items of data are generated.

19. The cryptographic communication system as claimed in claim 17, wherein said dividing means generates k items of data which will have the same data amount as original data before the k items of data are generated when an exclusive OR operation is performed on the k items of data.

20. The cryptographic communication system as claimed in claim 17, wherein said dividing means generates k items of data by successively allocating original data before the generation of the k items of data every fixed data amount.

21. The cryptographic communication system as claimed in claim 20, wherein when the data before the generation of the k items of data represent a character array, the fixed data amount is smaller than the data amount of one character.

22. The cryptographic communication system as claimed in claim 17, wherein said dividing means scrambles the data before the generation of the k items of data every fixed data amount, and then generates the k items of data from the scrambled data.

23. The cryptographic communication system as claimed in claim 22, wherein when the data before the generation of the k items of data represent a character array, the fixed data amount is smaller than the data amount of one character.

24. The cryptographic communication system as claimed in claim 17, wherein said cipher conversion means performs the decryption/re-encryption operation every fixed data amount.

25. An information processing device for use in a cryptographic communication system including at least one of first type terminals using a first cipher type, at least one of second type terminals using a second cipher type different from the first cipher type, and n cryptographic protocol conversion servers (n≧2) each of which uses the first cipher type and the second cipher type and converts data encrypted according to one cipher type to data encrypted according to the other cipher type, said first type terminals, said second type terminals and said third type terminals being connected to one another through at least one of networks, said information processing device being used as each of said first type terminals, characterized by comprising:

dividing means for dividing data to be transmitted into k items of data to be distributed among any of k independent cryptographic protocol conversion servers (n≧k≧2) of said n cryptographic protocol conversion servers on the basis of the data to be transmitted to a terminal of said second type terminals;

encryption means for encrypting the k items of data generated by said dividing means according to the first cipher type;

transmitting means for adding terminal information representing a transmission terminal and a reception terminal to the k items of data. encrypted by said encryption means, and then transmitting said k items of data encrypted to said k cryptographic protocol conversion servers;

decryption means for decrypting the k items of data transmitted from each of said k cryptographic protocol conversion servers according to the first cipher type; and restoring means for restoring original data from the k items of data decrypted by said decryption means.

26. The information processing device as claimed in claim 25, wherein said dividing means generates k items of data which will be the same data before the generation of the k items of data through an exclusive OR operation.

27. A cryptographic communication method for use in a cryptographic communication system including at least one of first type terminals using a first cipher type, at least one of second type terminals using a second cipher type different from the first cipher type, and n cryptographic protocol conversion servers (n≧2) using the first and second cipher types, said first type terminals, said second type terminals and said cryptographic protocol conversion servers being connected to one another through at least one of networks, said cryptographic communication method performing cryptographic communication between the first type terminals and the second type terminals, characterized in that:

each of said first type terminals divides data to be transmitted to a terminal of said second type terminals into k items of data to be distributed to k cryptographic protocol conversion servers (n≧k≧2) of said n cryptographic protocol conversion servers on the basis of the data to be transmitted to a terminal of the second type terminals, encrypts the divided k items of data according to the first cipher type, and adds terminal information representing a transmission terminal and a reception terminal to the encrypted k items of data to transmit the data to the k cryptographic protocol conversion servers;

each of the n cryptographic protocol conversion servers decrypts one data item transmitted from any terminal of the first type terminals according to the first cipher type, re-encrypts the decrypted data according to the second cipher type, and transmits the re-encrypted one data item to a reception terminal which is indicated by the terminal information added to the data; and each of the second type terminals decrypts the k items of data transmitted from each of the k cryptographic protocol conversion servers according to the second cipher type, and restores original data from the decrypted k items of data.

28. The cryptographic communication method as claimed in claim 27, wherein the generated k items of data have the same data amount, and each of the k items of data has a smaller data amount than that of the data before the k items of data are generated.

29. The cryptographic communication method as claimed in claim 27, wherein the k items of data will have the same data amount as original data before the k items of data are generated when an exclusive OR operation is performed on the k items of data.

30. The cryptographic communication method as claimed in claim 27, wherein the k items of data are generated by successively allocating original data before the generation of the k items of data every fixed data amount.

31. The cryptographic communication method as claimed in claim 30, wherein when the data before the generation of the k items of data represent a character array, the fixed data amount is smaller than the data amount of one character.

32. The cryptographic communication method as claimed in claim 27, wherein the data before the generation of the k items of data are scrambled every fixed data amount, and then the k items of data are generated from the scrambled data.

33. The cryptographic communication method as claimed in claim 32, wherein when the data before the generation of the k items of data represent a character array, the fixed data amount is smaller than the data amount of one character.

34. The cryptographic communication system as claimed in claim 27, wherein the decryption/re-encryption operation is performed every fixed data amount.

35. A cryptographic communication method for use in a cryptographic communication system including at least one of first type terminals using a first cipher type, at least one of second type terminals using a second cipher type different from the first cipher type, and n cryptographic protocol conversion servers (n≧2) using the first and second cipher types, the first type terminals, the second type terminals and the cryptographic protocol conversion servers being connected to one another through at least one of networks, said cryptographic communication method performing cryptographic communication between the first type terminals and the second type terminals, characterized in that:

each of the first type terminals divides data to be transmitted into k items of data to be distributed among k cryptographic protocol conversion servers (n≧k≧2) of the n cryptographic protocol conversion servers on the basis of the data to be transmitted to a terminal of the second type terminals, encrypts the divided k items of data according to the first cipher type, and then adds terminal information representing a transmission terminal and a reception terminal to the encrypted k items of data to transmit the data to the k cryptographic protocol conversion servers, and also decrypts the k items of data transmitted from each of the k cryptographic protocol conversion servers according to the first cipher type, and then restores original data from the decrypted k items of data;

each of the second type terminals divides data to be transmitted into k items of data to be distributed among k cryptographic protocol conversion servers (n≧k≧2) of the n cryptographic protocol conversion servers on the basis of the data to be transmitted to a terminal of the first type terminals, encrypts the divided k items of data according to the second cipher type, adds terminal information representing a transmission terminal and a reception terminal to the encrypted k items of data to transmit the data to the k cryptographic protocol conversion servers, decrypts the k items of data transmitted from each of the k cryptographic protocol conversion servers, according to the second cipher type, and restore original data from the k items of data decrypted by said decryption means; and each of the n cryptographic protocol conversion servers decrypts one data item transmitted from any one of the first type terminals and the second type terminals according to the cipher type of the first and second cipher types which is used by a transmission terminal indicated by the terminal information added to the data, then re-encrypts the data according to the cipher type of the first and second cipher types which is used by a reception terminal indicated by the terminal information added to the data, and transmits the re-encrypted one data item to the reception terminal indicated by the terminal information added to the data.

36. The cryptographic communication method as claimed in claim 35, wherein the generated k items of data have the same data amount, and each of the k items of data has a smaller data amount than that of the data before the k items of data are generated.

37. The cryptographic communication method as claimed in claim 35, wherein the k items of data will have the same data amount as original data before the k items of data are generated when an exclusive OR operation is performed on the k items of data.

38. The cryptographic communication method as claimed in claim 35, wherein the k items of data are generated by successively allocating original data before the generation of the k items of data every fixed data amount.

39. The cryptographic communication method as claimed in claim 38, wherein when the data before the generation of the k items of data represent a character array, the fixed data amount is smaller than the data amount of one character.

40. The cryptographic communication method as claimed in claim 35, wherein the data before the generation of the k items of data are scrambled every fixed data amount, and then the k items of data are generated from the scrambled data.

41. The cryptographic communication method as claimed in claim 40, wherein when the data before the generation of the k items of data represent a character array, the fixed data amount is smaller than the data amount of one character.

42. The cryptographic communication system as claimed in claim 35, wherein the decryption/re-encryption operation is performed every fixed data amount.

43. A cryptographic communication method for use in a cryptographic communication system including at least one of first type terminals using a first cipher type, at least one of second type terminals using a second cipher type different from the first cipher type, n first type cryptographic protocol conversion servers (n≧2) using a third cipher type which is different from the first and second cipher types, and n second type cryptographic protocol conversion servers (n≧2) which use the second and third cipher types and each of which beforehand corresponds to each of the n first type cryptographic protocol servers, the first and second type terminals and the first and second type cryptographic protocol conversion servers being connected to one another through at least one of networks, said cryptographic communication method performing cryptographic communication between the first type terminals and the second type terminals, characterized in that:

each of the first type terminals divides data to be transmitted into k items of data to be distributed among k cryptographic protocol conversion servers (n≧k≧2) of the n first type cryptographic protocol conversion servers on the basis of the data to be transmitted to a terminal of the second type terminals, encrypts the divided k items of data according to the first cipher type, adds terminal information representing a transmission terminal and a reception terminal to the encrypted k items of data to transmit the data to the k first type cryptographic protocol conversion servers, decrypts the k items of data transmitted from each of the k first type cryptographic protocol conversion servers according to the first cipher type, and restores original data from the decrypted k items of data;

each of the second type terminals divides data to be transmitted into k items of data to be distributed among k cryptographic protocol conversion servers (n≧k≧2) of the n second type cryptographic protocol conversion servers on the basis of the data to be transmitted to a terminal of the first type terminals, encrypts the divided k items of data according to the second cipher type, adds terminal information representing a transmission terminal and a reception terminal to the encrypted k items of data to transmit the data to the k second type cryptographic protocol conversion servers, decrypts the k items of data transmitted from each of the k second type cryptographic protocol conversion servers according to the second cipher type, and restores original data from the decrypted k items of data;

each of the n first type cryptographic protocol conversion servers decrypts one data item transmitted from any one of the first type terminals according to the first cipher type and then re-encrypts the data according to the third cipher type and for decrypting one data item transmitted from corresponding one cryptographic protocol conversion server of the n second type cryptographic protocol conversion servers according to the third cipher type and then re-encrypting the data according to the first cipher type, and transmits one data item re-encrypted according to the third cipher type to corresponding one cryptographic protocol conversion server of the n second type cryptographic protocol conversion servers and for transmitting one data item re-encrypted according to the first cipher type to a reception terminal indicated by the terminal information added to the data; and each of the n second type cryptographic protocol conversion servers decrypts one data item transmitted from any one of the second type terminals according to the second cipher type and then re-encrypts the data according to the third cipher type and for decrypting one data item transmitted from corresponding one cryptographic protocol conversion server of the n first type cryptographic protocol conversion servers according to the third cipher type and then re-encrypting the data according to the second cipher type, and transmits one data item re-encrypted according to the third cipher type to corresponding one cryptographic protocol conversion server of the n first type cryptographic protocol conversion servers and for transmitting one data item re-encrypted according to the second cipher type to a reception terminal indicated by the terminal information added to the data.

44. The cryptographic communication method as claimed in claim 43, wherein the generated k items of data have the same data amount, and each of the k items of data has a smaller data amount than that of the data before the k items of data are generated.

45. The cryptographic communication method as claimed in claim 43, wherein the k items of data will have the same data amount as original data before the k items of data are generated when an exclusive OR operation is performed on the k items of data.

46. The cryptographic communication method as claimed in claim 43, wherein the k items of data are generated by successively allocating original data before the generation of the k items of data every fixed data amount.

47. The cryptographic communication method as claimed in claim 46, wherein when the data before the generation of the k items of data represent a character array, the fixed data amount is smaller than the data amount of one character.

48. The cryptographic communication method as claimed in claim 43, wherein the data before the generation of the k items of data are scrambled every fixed data amount, and then the k items of data are generated from the scrambled data.

49. The cryptographic communication method as claimed in claim 48, wherein when the data before the generation of the k items of data represent a character array, the fixed data amount is smaller than the data amount of one character.

50. The cryptographic communication system as claimed in claim 43, wherein the decryption/re-encryption operation is performed every fixed data amount.

51. An information processing method for a cryptographic communication system including at least one of first type terminals using a first cipher type, at least one of second type terminals using a second cipher type different from the first cipher type, and n cryptographic protocol conversion servers ($n \geq 2$) using the first and second cipher types, said first type terminals, said second type terminals and said cryptographic protocol conversion servers being connected to one another through at least one of networks, said cryptographic communication method performing cryptographic communication between the first type terminals and the second type terminals, characterized in that:

k items of data to be distributed among k cryptographic protocol conversion servers ($n \geq k \geq 2$) of the n cryptographic protocol conversion servers are divided on the basis of the data to be transmitted to a terminal of the second type terminals, the divided k items of data are encrypted according to the first cipher type, terminal information representing a transmission terminal and a reception terminal is added to the encrypted k items of data to transmit the data to the k cryptographic protocol conversion servers, k items of data transmitted from the k cryptographic protocol conversion servers are decrypted according to the first cipher type, and then original data are restored from the decrypted k items of data.

52. The information processing method as claimed in claim 51, wherein the generated k items of data will be the same as the data before the generation thereof by performing an exclusive OR operation.

* * * * *